United States Patent
Hayakawa

(10) Patent No.: US 9,061,562 B2
(45) Date of Patent: Jun. 23, 2015

(54) SUSPENSION CONTROL APPARATUS

(71) Applicant: HONDA MOTOR CO., LTD, Tokyo (JP)

(72) Inventor: Yukio Hayakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/927,211

(22) Filed: Jun. 26, 2013

(65) Prior Publication Data

US 2014/0005889 A1 Jan. 2, 2014

(30) Foreign Application Priority Data

Jun. 29, 2012 (JP) ................................. 2012-147443

(51) Int. Cl.
*B60G 17/019* (2006.01)
*B60G 17/08* (2006.01)

(52) U.S. Cl.
CPC .......... *B60G 17/01933* (2013.01); *B60G 17/08* (2013.01); *B60G 2400/0523* (2013.01);
(Continued)

(58) Field of Classification Search
CPC ................... B60G 2400/104; B60G 2400/204; B60G 2400/822; B60G 2400/208; B60G 2400/252; B60G 2500/10; B60G 2500/11; B60G 17/08; B60G 17/016; B60G 17/162; B60G 2800/012; B60G 2800/24; B60G 17/0162
USPC .............. 701/38, 79, 72, 70, 51, 42, 37, 31.4; 280/5.52, 5.512, 5.511, 5.51, 5.506, 280/5.501; 180/65.51, 422, 248, 197, 169
See application file for complete search history.

(56) References Cited

U.S. PATENT DOCUMENTS

2002/0128760 A1\* 9/2002 Bodie et al. ..................... 701/37
2004/0094634 A1\* 5/2004 Watanabe et al. ............... 238/14
(Continued)

FOREIGN PATENT DOCUMENTS

JP 6-48139 A 2/1994
JP 8-25935 A 1/1996
(Continued)

OTHER PUBLICATIONS

Japanese Office Action dated Jan. 28, 2014, issued in corresponding Japanese Patent Application No. 2012-147443 (3 pages).
(Continued)

*Primary Examiner* — Helal A Algahaim
*Assistant Examiner* — Jelani Smith
(74) *Attorney, Agent, or Firm* — Westerman, Hattori, Daniels & Adrian, LLP

(57) ABSTRACT

A suspension control apparatus includes a single-wheel model calculating unit that calculates a sprung speed and a stroke speed using a single-wheel model on the basis of a wheel speed variation detected by a wheel speed sensor and a damper control unit that controls the damping force of a variable damping force damper by setting a skyhook control target current and an unsprung vibration damping control target current of the variable damping force damper on the basis of the calculated sprung speed and stroke speed. When a slip determining unit determines that the wheel is in a slipping state based on deviation of a value detected by the wheel speed sensor from a wheel speed estimated by the vehicle body speed estimating unit by a predetermined value or more, the damper control unit suppresses skyhook and unsprung vibration damping control by fixing or gradually decreasing the control target currents.

12 Claims, 20 Drawing Sheets

(52) U.S. Cl.
CPC ..... *B60G2400/104* (2013.01); *B60G 2400/208* (2013.01); *B60G 2400/302* (2013.01); *B60G 2400/32* (2013.01); *B60G 2400/39* (2013.01); *B60G 2400/41* (2013.01); *B60G 2500/10* (2013.01)

(56) References Cited

U.S. PATENT DOCUMENTS

| | | | |
|---|---|---|---|
| 2005/0178628 A1* | 8/2005 | Uchino et al. | 188/379 |
| 2008/0183353 A1* | 7/2008 | Post et al. | 701/42 |
| 2008/0284118 A1* | 11/2008 | Venton-Walters et al. | 280/6.154 |
| 2010/0241305 A1 | 9/2010 | Itabashi et al. | |

FOREIGN PATENT DOCUMENTS

| | | |
|---|---|---|
| JP | 2007-160944 A | 6/2007 |
| JP | 2008-030536 A | 2/2008 |
| JP | 2009-241813 A | 10/2009 |
| WO | 2008/050782 A1 | 5/2008 |

OTHER PUBLICATIONS

Japanese Office Action dated Aug. 26, 2014, issued in corresponding Japanese Patent Application No. 2012-147443 (3 pages).

* cited by examiner

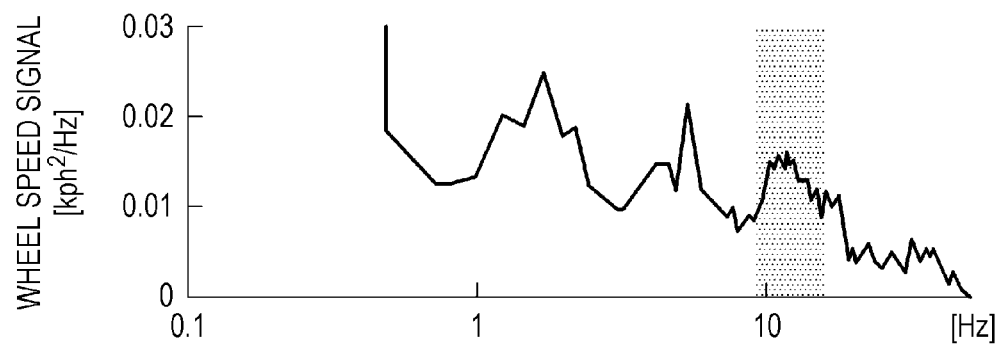
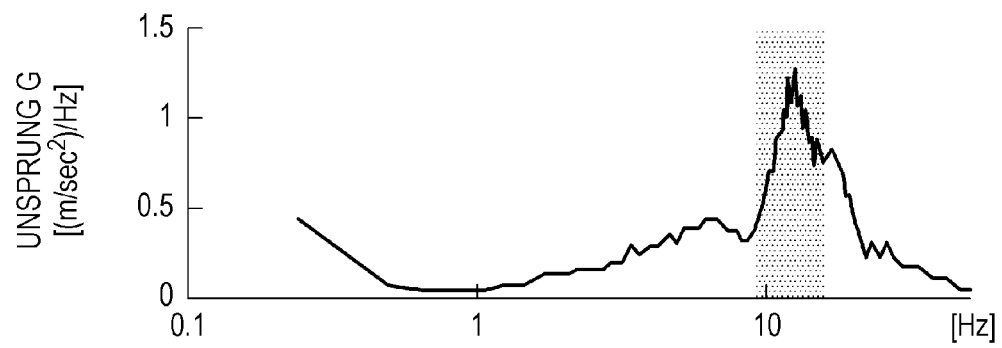

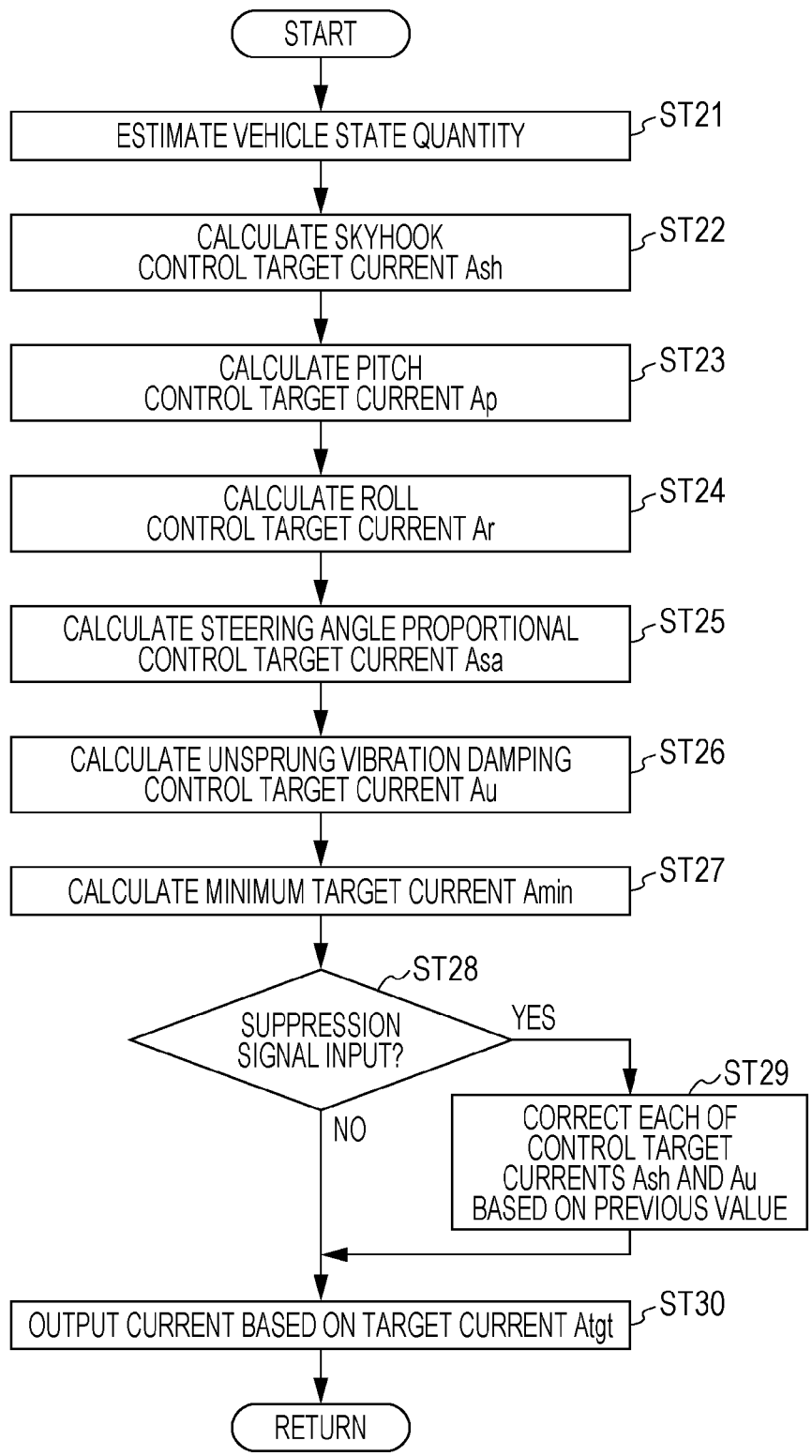

SUSPENSION CONTROL APPARATUS

CROSS REFERENCES TO RELATED APPLICATIONS

The present application claims priority under 35 U.S.C. §119 to Japanese Patent Application No. 2012-147443, filed Jun. 29, 2012, entitled "Suspension Control Apparatus." The contents of this application are incorporated herein by reference in their entirety.

TECHNICAL FIELD

The present disclosure relates to a vehicle suspension control apparatus for use in a vehicle including a variable damping force damper having a damping force adjustable in accordance with an input signal.

BACKGROUND

In recent years, various types of variable damping force dampers for vehicle having a damping force adjustable in a stepwise or continuous manner have been developed. Examples of known mechanisms of changing the damping force can include a mechanical mechanism of changing the area of an orifice in a piston using a rotary valve and an MRF-type mechanism of controlling the viscosity of a magneto-rheological fluid (hereinafter referred to as MRF) used in hydraulic oil by the use of a magnetic fluid valve on a piston. A vehicle equipped with such a variable damping force damper (hereinafter referred to simply as damper) can improve the steering stability and the riding comfort by variably controlling the damping force of the damper depending on the running state of the vehicle.

One known example of the method for improving the riding comfort is skyhook control based on the skyhook principle. The skyhook control of controlling the riding comfort (vibration damping control) sets a target damping force so as to suppress vertical movement of the sprung portion. Thus it is necessary to detect the sprung speed. Even when the damper has a characteristic in which the area of an orifice and the viscosity of an MRF are fixed, because the damping force varies in accordance with the stroke speed, it is necessary to detect the stroke speed, that is, the relative displacement speeds of the sprung and unsprung portions in order to perform the skyhook control.

Traditionally, a suspension control apparatus that performs the skyhook control needs to have a vertical G sensor and a stroke sensor for each wheel in order to detect the vertical sprung speed and stroke speed. However, because the stroke sensor is required to be attached to the inside of the wheel house or its adjacent area, it is difficult to find a sufficient space for accommodating it. To address this issue, a suspension control apparatus that includes no stroke sensor, calculates the relative displacement speeds of the sprung and unsprung portions from the amount of variation in the wheel speed, and controls the damping force of the damper on the basis of the calculated relative displacement speeds and others is proposed (see Japanese Unexamined Patent Application Publication No. 6-48139).

The suspension apparatus described in the above-mentioned patent literature calculates the relative displacement speeds of the sprung and unsprung portions by using the fact that the wheel speed varies as a result of relative displacement in a longitudinal (front and rear) direction occurring in accordance with the caster angle when the wheels relatively displace in a vertical direction with respect to the vehicle body by suspension geometry. Accordingly, if no caster angle is set in the suspension or it is very small, the calculation accuracy is lower or it is impossible to calculate the relative displacement speeds. Because the relative displacement speeds are calculated on the basis of the wheel speed, if the wheel slips, it is difficult to conduct precise control based on the relative displacement speeds, and the behavior of the vehicle may be unstable.

SUMMARY

The present application describes a suspension control apparatus capable of calculating a quantity of state of a vehicle for use in controlling a damping force of a damper with high precision, independently of a caster angle set in the suspension, and of maintaining the stability of the vehicle behavior even if a wheel slips.

According to an aspect of the present application, a suspension control apparatus (20) for use in a vehicle (V) including a variable damping force damper (6) having a damping force adjustable in accordance with an input signal (Vw) is provided. The suspension control apparatus includes a wheel speed sensor (9), a basic input amount calculating unit (37), a state quantity calculating unit (33), a damper control unit (23, 25), a vehicle body speed estimating unit (32), and a slip determining unit (50). The wheel speed sensor detects a wheel speed (Vw) of each wheel (3). The basic input amount calculating unit calculates a basic input amount ($u_1$) for the vehicle on the basis of a variation ($\Delta Vw$) in the wheel speed detected by the wheel speed sensor. The state quantity calculating unit calculates a quantity ($S_2$ and Ss) of state of the vehicle by inputting the basic input amount into a vehicle model (38) that represents a behavior of the vehicle. The damper control unit controls the damping force of the variable damping force damper on the basis of the calculated quantity of state. The vehicle body speed estimating unit estimates a vehicle body speed (Vb) on the basis of a vehicle body acceleration (Gx) of the vehicle. The slip determining unit determines that the wheel is in a slipping state when a value detected by the wheel speed sensor deviates from an estimated wheel speed based on the vehicle body speed by a predetermined value or more. When the slip determining unit determines that the wheel is in the slipping state, the damper control unit suppresses damper control based on the variation in the wheel speed detected by the wheel speed sensor (fixes or gradually decreases Ash, Au). Here, the basic input amount indicates the amount of input received by the wheel from the outside, such as a road, independently of suspension geometry.

With this configuration, calculating the basic input amount of the vehicle on the basis of the detected variation in the wheel speed and inputting the value into the vehicle model enables calculation of the quantity of state of the vehicle for use in damping force control for the variable damping force damper. Accordingly, the quantity of state of the vehicle can be calculated with high precision, independently of a caster angle in the suspension. Suppressing damper control based on the variation in the wheel speed when the wheel is determined to be in a slipping state can prevent instability of the behavior of the vehicle caused by inaccurate control based on the wheel speed.

According to one aspect of the present application, when the slip determining unit determines that the wheel is in the slipping state, the damper control unit may suppress control based on the variation in the wheel speed detected by the wheel speed sensor by fixing an amount of control (Ash, Au) on the variable damping force damper at a predetermined amount.

With this configuration, when the wheel is determined to be in the slipping state, fixing the amount of control at the predetermined amount, for example, the amount of control before the slipping enables the amount of control on the variable damping force damper to be suppressed such that no change occurs. Accordingly, degradation in the vehicle behavior can be prevented.

According to one aspect of the present application, when the slip determining unit determines that the wheel is in the slipping state, the damper control unit may suppress control based on the variation in the wheel speed detected by the wheel speed sensor by gradually decreasing an amount of control (Ash, Au) on the variable damping force damper from a predetermined amount.

With this configuration, when the wheel is determined to be in the slipping state, gradually decreasing the amount of control from the predetermined amount, for example, the amount of control before the slipping enables the amount of control on the variable damping force damper to be effectively suppressed such that no sudden change occurs. Accordingly, degradation in the vehicle behavior can be prevented.

According to one aspect of the present application, the suspension control apparatus may further include a turning state quantity detecting unit (10) that detects a quantity (Gy) of state of turning of the vehicle, the damper control unit may include a roll control unit (92) that sets an amount of control (Ar) on the variable damping force damper on the basis of the quantity of state of turning detected by the turning state quantity detecting unit, and, when the slip determining unit determines that the wheel is in the slipping state, the damper control unit may maintain the amount of control set by the roll control unit.

With this configuration, even when the wheel is determined to be in the slipping state, suppressing a change in the roll posture by maintaining the roll control independent of the wheel speed enables disturbance in the vehicle behavior to be suppressed. This can improve the accuracy of control in a vehicle behavior stabilizing device that is actuated in, for example, a slipping state. In the above descriptions of several aspects of the present application, some specific elements are indicated by parentheses for the purpose of facilitating understanding and should not be regarded as limiting the scope of accompanying claims.

BRIEF DESCRIPTION OF THE DRAWINGS

The advantages of the disclosure will become apparent in the following description taken in conjunction with the following drawings.

FIGS. 15A and 15B are frequency response diagrams in which a wheel speed and an unsprung acceleration are contrasted.

FIG. 20 is a flowchart that illustrates a procedure of controlling a damping force by the suspension control apparatus illustrated in FIG. 19.

DETAILED DESCRIPTION

Figure 1:
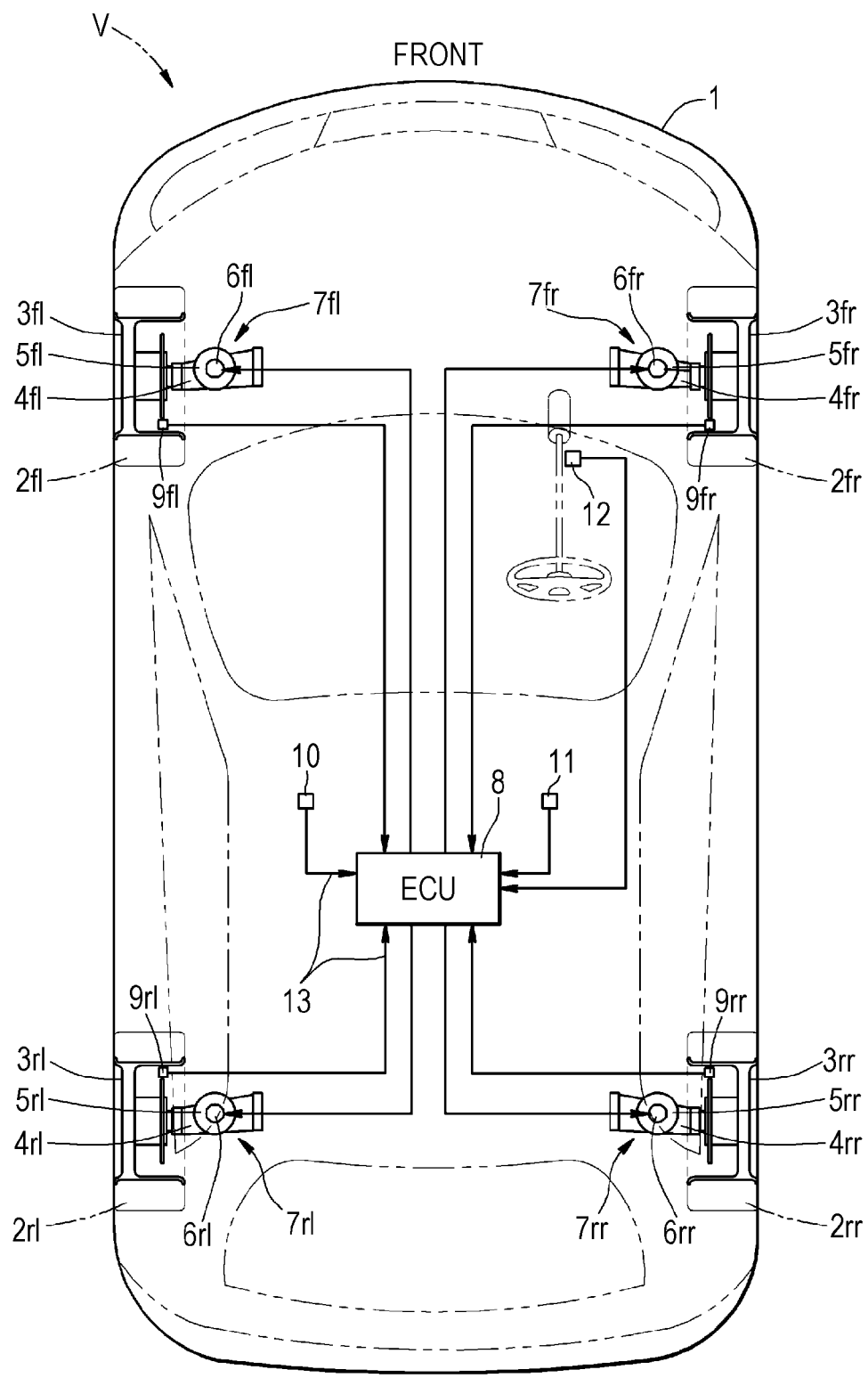
FIG. 1 illustrates a schematic configuration of a vehicle that uses a suspension control apparatus according to a first embodiment.

Embodiments in which a suspension control apparatus 20 is used in a four-wheel car are described in detail below with reference to the drawings. In the drawings, four wheels 3 and elements pertaining to them, that is, dampers 6, wheel speeds Vw, and others are represented as ones with the suffix indicating the front, rear, left, and right. For example, the wheels 3 are represented as the wheel 3*fl* (front left wheel), wheel 3*fr* (front right wheel), wheel 3*rl* (rear left wheel), and wheel 3*rr* (rear right wheel).

First Embodiment

Schematic Configuration of Car V

First, a schematic configuration of a car V according to a first embodiment is described with reference to FIG. 1. The car (vehicle) V includes a vehicle body 1 provided with the wheels 3 to which tires 2 are attached. The wheels 3 are positioned on the right and left sides at the front and rear of the vehicle body 1. The wheels 3 are suspended on the vehicle body 1 by respective suspensions 7. Each of the suspensions 7 includes a suspension arm 4, a spring 5, and a variable damping force damper (hereinafter referred to simply as damper 6). The car V includes an electronic control unit (ECU) 8 for use in various types of control, wheel speed sensors 9 arranged for the respective wheels 3 and detecting the wheel speeds Vw thereof, a lateral G sensor 10 for detecting a lateral acceleration Gy of the vehicle body 1, a yaw rate sensor 11 for detecting a yaw rate γ of the vehicle body 1, and a steering angle sensor 12 for detecting a steering angle δf. These elements are positioned in appropriate locations.

The car V includes a brake device operative as an antilock brake system (ABS) preventing the wheels from being locked during braking, a traction control system (TCS) preventing wheel spinning during acceleration, or a publicly known vehicle stability assist (VSA) control serving as a vehicle behavior stabilizing control system including the ABS and TCS and having the automatic braking function for use in yaw moment control during turning and in brake assist function. The above-described brake systems are not illustrated. The ABS, TCS, and VSA determine that the wheel is in a slipping state by deviation of a value detected by the wheel speed sensor 9 from a wheel speed based on an estimated vehicle body speed Vb by a predetermined value or more and stabilizes the behavior of the vehicle by conducting optimal brake control or traction control depending on the running state.

The car V further includes a brake pressure sensor for detecting a brake hydraulic pressure Pb of the brake device, a torque sensor for detecting a driving torque Te, and a gear position sensor for detecting a gear position Pg of the transmission. These sensors are positioned in appropriate locations.

The ECU 8 may include a microcomputer, a read-only memory (ROM), a random-access memory (RAM), a peripheral circuit, an input-output interface, and various drivers. The ECU 8 is connected to the damper 6 of each of the wheels 3 and the sensors 9 to 12 through a communication line (in the present embodiment, controller area network (CAN) 13). The ECU 8 and these sensors 9 to 12 constitute the suspension control apparatus 20.

Although the details are not illustrated in the drawings, the damper 6 in the present embodiment is of the mono-tube type (de Carbon type) and has a publicly known configuration in which a piston rod is disposed inside a cylinder filled with the MRF and is slidable in the axial direction, a piston on the tip of the piston rod partitions the inside of the cylinder into an upper oil chamber and a lower oil chamber, and a communication path communicating with the upper and lower oil chambers and an MLV coil positioned inside the communication path are disposed on the piston.

Figure 2:
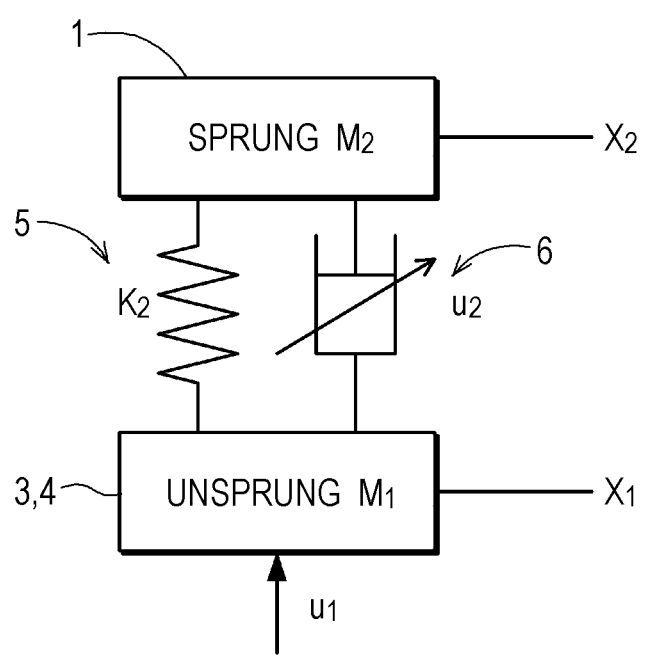
FIG. 2 illustrates a model of a suspension illustrated in FIG. 1.

Of the damper 6, the lower end of the cylinder is coupled to the upper surface of the suspension arm 4, which is a wheel-side member, and the upper end of the piston rod is coupled to a damper base (wheel housing upper portion), which is a vehicle body-side member. As schematically illustrated in FIG. 2, each of the dampers 6 couples an unsprung portion having mass $M_1$ (movable portion positioned below the suspension spring and including the wheel 3, a knuckle, and the suspension arm 4) and a sprung portion having mass $M_2$ and including the vehicle body 1.

When a current is supplied from the ECU 8 to the MLV coil, a magnetic field is applied to the MRF flowing through the communication path, and ferromagnetic fine particles form a chain cluster. The apparent viscosity of the MRF passing through the communication path (hereinafter referred to simply as viscosity) increases, and the damping force of the damper 6 increases.

ECU 8

Then, a schematic configuration of the ECU 8 controlling the damper 6 among the elements of the suspension control apparatus 20 is described with reference to FIG. 3. The ECU 8 conducts control on the ABS, TCS, and VSA, in addition to the damper 6, but a vehicle behavior control unit that conducts control on the ABS, TCS, and VSA is not described here.

The ECU 8 includes, as the main part, an input unit 21 connected to the above-described sensors 9 to 12 and the vehicle behavior control unit through the CAN 13, a vehicle state quantity estimating unit 22 that estimates a quantity of state of the car V from signals detected by the sensors 9 to 12, a control target current setting unit 23 that sets various control target currents for each of the dampers 6 using various values calculated by the vehicle state quantity estimating unit 22 and signals detected by the sensors 9 to 12 to improve the steering stability and the riding comfort of the car V, a current fixing unit 24 that sets a current fixing signal Sfix to fix a driving current of the damper 6 in accordance with a predetermined condition, and a damper control unit 25 that selects a target current Atgt for each of the dampers 6 from among various control target currents set by the control target current setting unit 23, that produces a driving current to be supplied to each of the dampers 6 (MLV coils) in accordance with the current fixing signal Sfix, and that controls the damping force of the damper 6.

Vehicle State Quantity Estimating Unit 22

The vehicle state quantity estimating unit 22 estimates a quantity of state of the car V by using the fact that there is a certain correlation between a wheel speed variation ΔVw and a variation in the ground load of the wheel 3. The vehicle state quantity estimating unit 22 includes a state quantity calculating unit 31 that estimates various quantities of state of the car V for each wheel using a vehicle model, and a vehicle body speed estimating unit 32 that calculates a vehicle body speed Vb (inner-wheel vehicle body speed Vbi and outer-wheel vehicle body speed Vbo). The vehicle body speed Vb is the amount of correction of a wheel speed for the state quantity calculating unit 31. The state quantity calculating unit 31 includes a single-wheel model calculating unit 33 corresponding to each of the front (left & right) and rear (left & right) wheels, a four-wheel model calculating unit 34, and a slip determining unit 50 (see FIG. 4). The vehicle body speed estimating unit 32 includes an accelerating and decelerating force calculating unit 51 and a steering correction amount calculating unit 53 that calculates the amount of correction resulting from a steering operation. The elements in the vehicle state quantity estimating unit 22 are described in detail below with reference to FIGS. 4 to 11B.

State Quantity Calculating Unit 31

Figure 4:
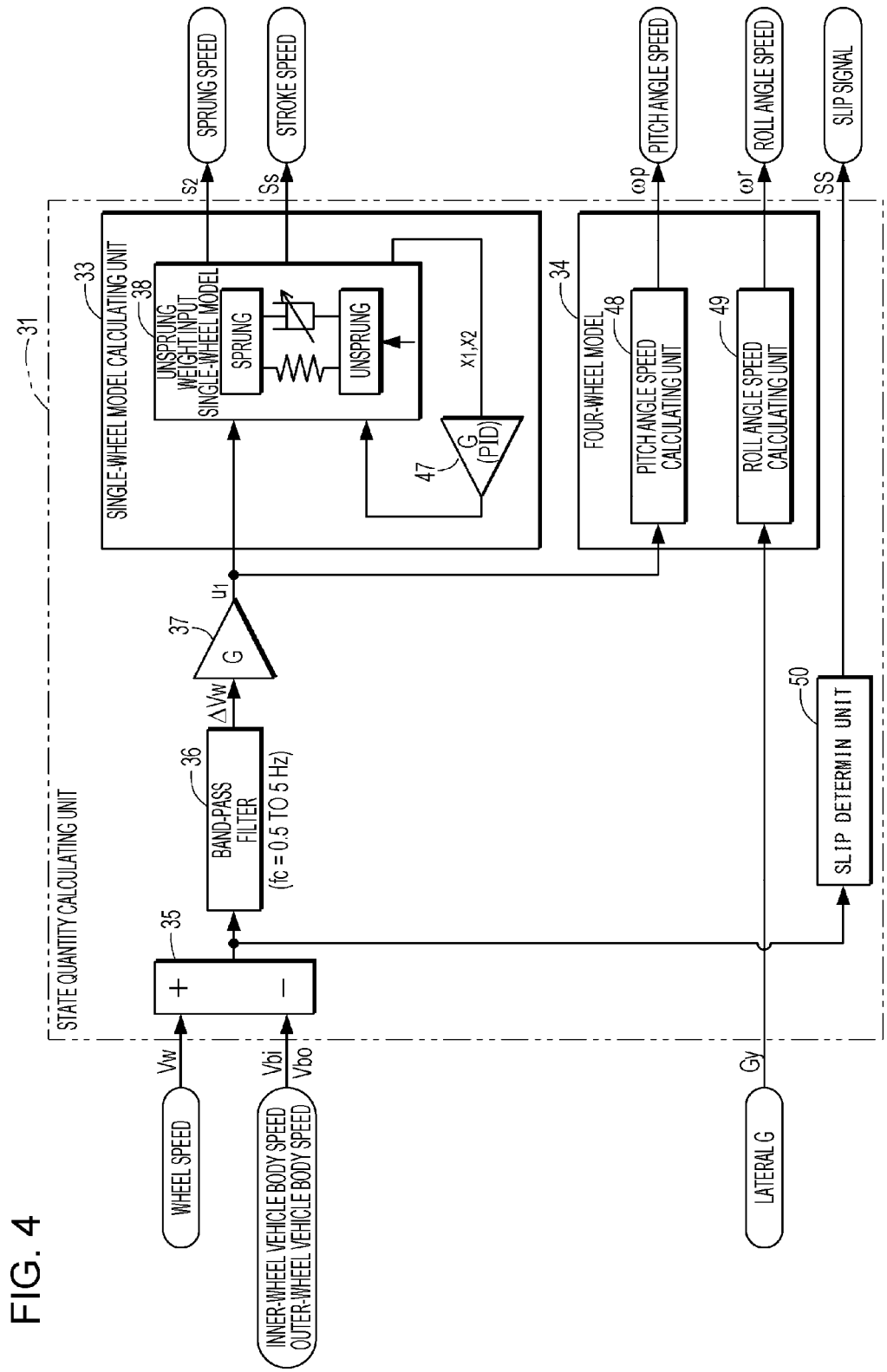
FIG. 4 is a block diagram of a state quantity estimating unit illustrated in FIG. 3.

As illustrated in FIG. 4, the wheel speed Vw (signal) is input in a subtractor 35 in the state quantity calculating unit 31 as an adding value. The inner-wheel vehicle body speed Vbi or outer-wheel vehicle body speed Vbo, both of which are described below, is input in the subtractor 35 as a subtracting value. The subtractor 35 subtracts the inner-wheel vehicle body speed Vbi or outer-wheel vehicle body speed Vbo from each wheel speed Vw, thereby correcting the wheel speed Vw. The subtractor 35 also functions as a wheel speed variation calculating unit that calculates the wheel speed variation ΔVw on the basis of the wheel speed Vw.

The inner-wheel vehicle body speed Vbi or outer-wheel vehicle body speed Vbo input in the subtractor 35 is calculated to remove a wheel speed variation component caused by a change in vehicle speed of the car V or the difference between locus lengths resulting from the difference between the turning radiuses of the inner and outer wheels, as described below. That is, the subtractor 35 functions as a correcting unit that makes a correction of removing a vehicle body speed Vb component resulting from an operation by a driver from the wheel speed Vw by subtracting the inner-wheel vehicle body speed Vbi or outer-wheel vehicle body speed Vbo calculated by the vehicle body speed estimating unit 32 from each wheel speed Vw that is the speed before being input into a band-pass filter 36.

The wheel speed Vw output from the subtractor 35 is input into a gain circuit 37 through the band-pass filter 36. The band-pass filter 36 has a band-pass characteristic of allowing a frequency component in the range of 0.5 to 5 Hz to pass therethrough. In the present embodiment, the CAN 13 is used as a communication line, and the wheel speed Vw signals are input at an updating interval of approximately 10 to 20 msec. Thus the band-pass filter 36 has a low-pass characteristic of allowing a component lower than approximately 5 Hz to pass therethrough in order to block a high-frequency component and stably extract a frequency component in the resonance range of the sprung portion (a signal in a frequency range corresponding to the sprung oscillations). If the wheel speed Vw signals are input at a shorter updating interval, the band-pass filter 36 may have a low-pass characteristic of a higher passband, such as 20 Hz, to additionally extract a frequency component in the resonance range of the unsprung portion.

The band-pass filter 36 has a characteristic of allowing a component in a band that is higher than approximately 0.5 Hz to pass therethrough to remove a DC component from sequentially input wheel speed Vw signals. With this characteristic, it can remove, from a signal in a low frequency band at or below 5 Hz corresponding to the sprung oscillations, a vehicle body speed Vb component resulting from an operation by a driver (vehicle body speed component resulting from the braking/driving force). That is, the band-pass filter 36 functions as a wheel speed variation extracting unit that extracts the wheel speed variation $\Delta Vw$ on the basis of the wheel speed Vw. Because the DC component can be removed from the wheel speed Vw signal by the band-pass filter 36, it may be possible to omit the subtractor 35 subtracting the vehicle body speed Vb from the wheel speed Vw.

The gain circuit 37 converts the wheel speed variation $\Delta Vw$ for each wheel into unsprung weight $u_1$ (ground load variation) by using the fact that there is a certain correlation between the wheel speed variation $\Delta Vw$ and unsprung weight $u_1$. The relationship between the wheel speed variation $\Delta Vw$ and unsprung weight $u_1$ used by the gain circuit 37 is described below.

Figure 5A:
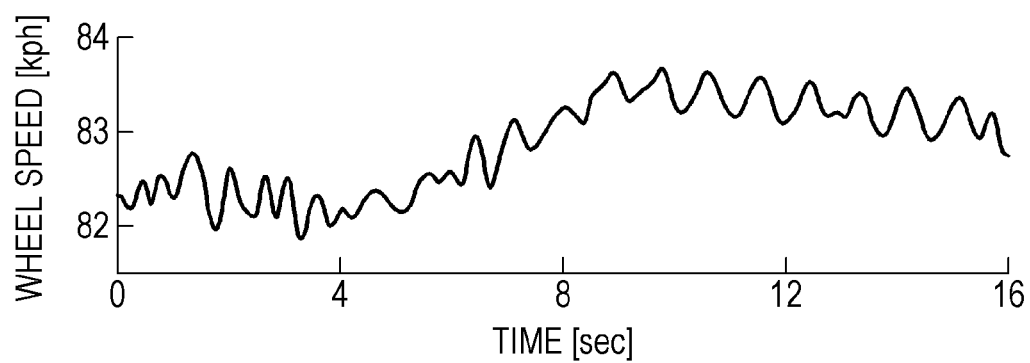
FIGS. 5A and 5B are timing charts that illustrate a relationship between a wheel speed and a ground load in an unsprung weight single-wheel model illustrated in FIG. 4.
Figure 5B:
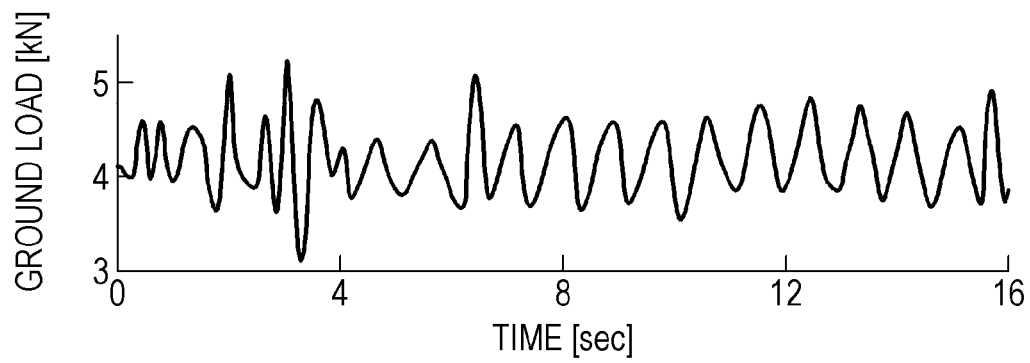

For example, when the car V runs on a flat road in a straight line, the ground load of the wheel 3 is constant and the wheel speed Vw is also constant. Here, the grounding section of the wheel 3 deforms according to the ground load (unsprung mass $M_1$+sprung mass $M_2$), and the dynamic load radius Rd of the tire 2 is smaller than that in a no-load state. However, when the amount of variation in the ground load fluctuates due to irregularities of the road surface, as illustrated in FIG. 5B, while the vehicle runs at a speed of approximately 80 km/h, for example, the amount of variation in the wheel speed also fluctuates, as illustrated in FIG. 5A, in accordance with the amount of variation in the ground load as a result of the change in the dynamic load radius Rd of the tire 2. Here, as in the case where the ground load varies with approximately 1 Hz due to a road bounce, the wheel speed Vw also varies with approximately 1 Hz. Both of the wheel speed Vw and ground load are values detected by sensors.

Figure 6:
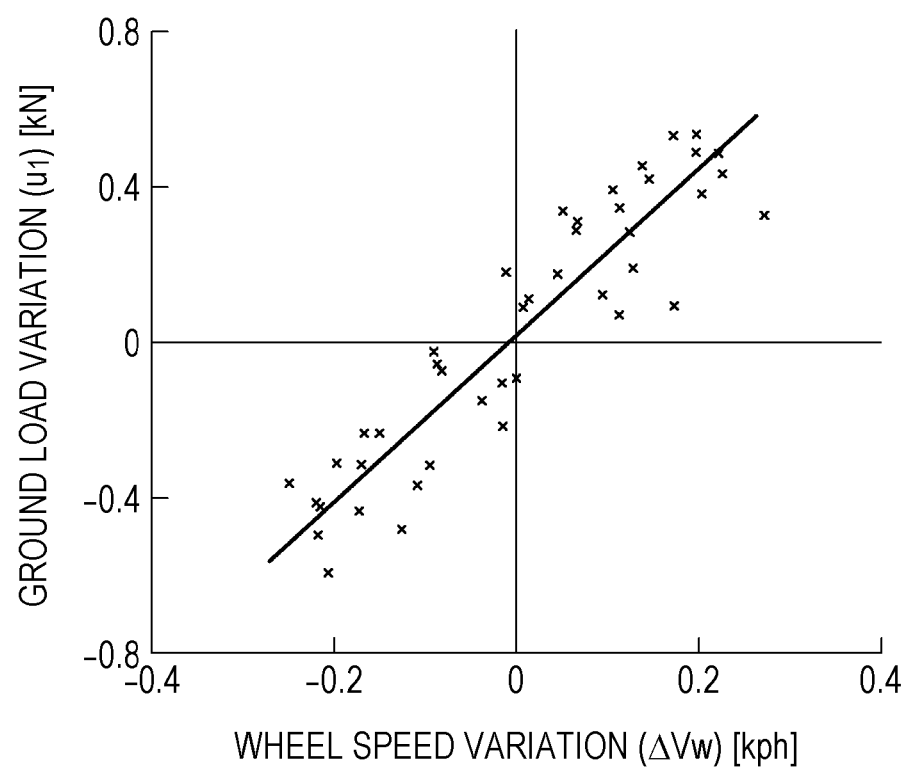
FIG. 6 is a graph that illustrates a correlation between a variation in the wheel speed and a variation in the ground load in the unsprung weight single-wheel model illustrated in FIG. 4.

FIG. 6 is a graph that plots values obtained by band-pass filtering signals detected by both sensors (here, by causing signals to pass through a band-pass filter with a passband of 0.5 to 2 Hz) with the horizontal axis representing the wheel speed variation $\Delta Vw$ and the vertical axis representing the ground load variation. As illustrated in FIG. 6, the wheel speed variation $\Delta Vw$ and ground load variation are in a proportional relationship and can be stated as follows:

$$u_1 = k\Delta Vw$$

where k is a proportionality constant.

The gain circuit 37 illustrated in FIG. 4 calculates the unsprung weight $u_1$ of each wheel by multiplying the wheel speed variation $\Delta Vw$ by the proportionality constant k. That is, the gain circuit 37 functions as a basic input amount calculating unit that calculates the unsprung weight $u_1$, which is a basic input amount for the car V, on the basis of the wheel speed variation $\Delta Vw$ detected by the wheel speed sensor 9.

In this way, the correction of removing the vehicle body speed Vb component from the wheel speed Vw signal can avoid influences due to the variation in the vehicle body speed and enable the wheel speed variation $\Delta Vw$ to be accurately calculated. In addition, causing the wheel speed Vw signal to pass through the band-pass filter 36 corresponding to the sprung oscillations enables the unsprung weight $u_1$ to be calculated with high precision on the basis of the wheel speed variation $\Delta Vw$. Cutting a component in a frequency band corresponding to the unsprung oscillations through the band-pass filter 36 can avoid need for excessively high accuracy of detection by the wheel speed sensor 9, measurement interval, and communication speed, and versatility of the suspension control apparatus 20 can be increased.

Single-Wheel Model Calculating Unit 33

The unsprung weight $u_1$ output from the gain circuit 37 is input into a single-wheel model 38 included in the single-wheel model calculating unit 33. The single-wheel model calculating unit 33 calculates and outputs a quantity of state of the car V, such as a sprung speed $S_2$ and a stroke speed Ss of the suspension 7 for use in computation of a skyhook control unit 90, by inputting the unsprung weight $u_1$ into the single-wheel model 38. That is, the single-wheel model 38 serves as a state quantity calculating unit that calculates various quantities of state of the car V using the wheel speed variation $\Delta Vw$ as an external force.

Here, one example of the single-wheel model 38 is described in detail. As described above, each of the wheels 3 of the car V can be illustrated as in FIG. 2, and the unsprung weight $u_1$ of the wheel 3 as an input u can be stated as expression (1) below. In the expressions and drawings in the present specification, a first-order differential value (dx/dt) and a second-order differential value ($d^2x/dt^2$) are expressed as follows:

$$dx/dt = \dot{x}, d^2x/dt^2 = \ddot{x}$$

$$u = M_1\ddot{x}_1 + M_2\ddot{x}_2 \quad (1)$$

where $M_1$ is the unsprung mass, $M_2$ is the sprung mass, $x_1$ is the vertical location of the unsprung portion, $x_2$ is the vertical location of the sprung portion, $d^2x_1/dt^2$ is the vertical acceleration of the unsprung portion, and $d^2x_2/dt^2$ is the vertical acceleration of the sprung portion.

Here, the unsprung mass $M_1$ and sprung mass $M_2$ are known. The input u contains a damping force $u_2$ of the damper 6, in addition to the unsprung weight $u_1$, because the damper 6 has a variable damping force. The damping force $u_2$ of the damper 6 can be calculated in the single-wheel model 38 on the basis of the unsprung weight $u_1$. If the unsprung weight $u_1$ can be calculated on the basis of the wheel speed Vw, the use of a system matrix that employs the unsprung weight $u_1$ and the damping force $u_2$ of the damper 6 calculated on the basis of the unsprung weight $u_1$ as the input u and that considers a spring constant K between the sprung and unsprung portions (spring constant of the spring 5), the unsprung mass $M_1$, and the sprung mass $M_2$ enables the vertical accelerations $d^2x_1/dt^2$ and $d^2x_2/dt^2$ of the unsprung and the sprung portions, the unsprung location $x_1$, and the unsprung speed dx/dt to be determined. The stroke speed Ss can be represented as $dx_2/dt - dx_1/dt$.

Specifically, $M_1 \cdot d^2x_1/dt^2$ and $M_2 \cdot d^2x_2/dt^2$ in the above expression (1) can be represented as the following expressions (2) and (3), respectively:

$$M_1 \ddot{x}_1 = u_1 - K_2(x_1 - x_2) - u_2 \qquad (2)$$

$$M_2 \ddot{x}_2 = K_2(x_1 - x_2) + u_2 \qquad (3)$$

where $u_1$ is the unsprung weight, $u_2$ is the damping force of the damper 6, and K is the spring constant.

The single-wheel model 38 uses the equation of state of expression (4) below as a model and calculates a state variable x in expression (5) below based on input vector u.

$$\dot{x} = Ax + Bu \qquad (4)$$

$$x = [x_1 x_2 \dot{x}_1 \dot{x}_2]^T \qquad (5)$$

where x is the state variable vector, and A and B are system matrices. Based on the above expressions (2) to (5), the above expression (4) can be represented as the following expression (6):

$$\dot{x} = \begin{bmatrix} \dot{x}_1 \\ \dot{x}_2 \\ \ddot{x}_1 \\ \ddot{x}_2 \end{bmatrix} = \begin{bmatrix} 0 & 0 & 1 & 0 \\ 0 & 0 & 0 & 1 \\ \frac{-K_2}{M_1} & \frac{K_2}{M_1} & 0 & 0 \\ \frac{K_2}{M_2} & \frac{-K_2}{M_2} & 0 & 0 \end{bmatrix} \begin{bmatrix} x_1 \\ x_2 \\ \dot{x}_1 \\ \dot{x}_2 \end{bmatrix} + \begin{bmatrix} 0 & 0 \\ 0 & 0 \\ \frac{1}{M_1} & -\frac{1}{M_1} \\ 0 & \frac{1}{M_2} \end{bmatrix} \begin{bmatrix} u_1 \\ u_2 \end{bmatrix} \qquad (6)$$

Figure 7:
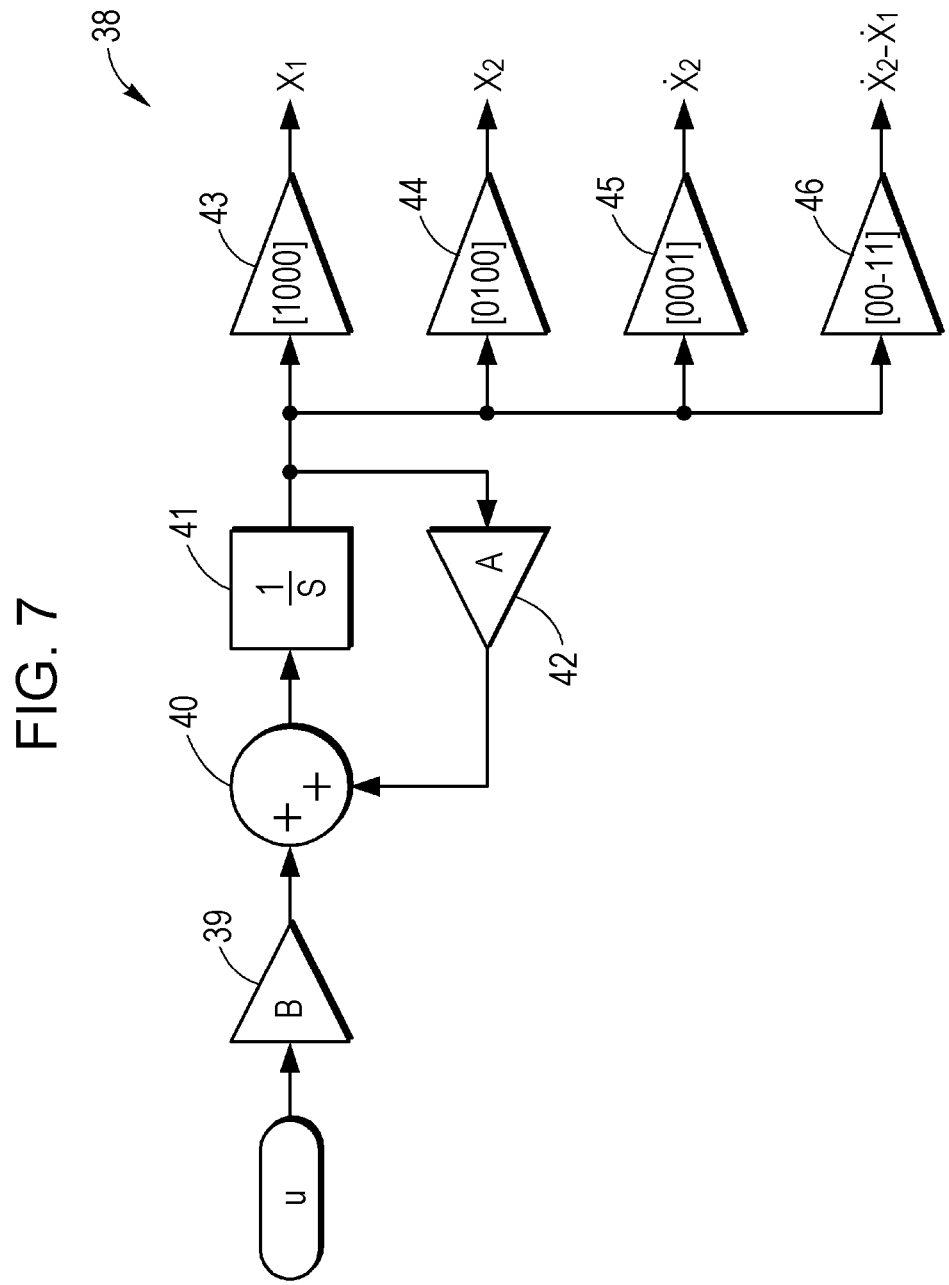
FIG. 7 is a block diagram of an unsprung weight single-wheel model calculating unit illustrated in FIG. 4.

The single-wheel model 38 using the above-described equation of state inputs the input u into a computing unit 39 using the system matrix B, inputs an output from the computing unit 39 into an integrator 41 through an adder 40, inputs an output from the integrator 41 into a computing unit 42 using the system matrix A, and returns it to the adder 40, as illustrated in FIG. 7. The unsprung location $x_1$, sprung location $x_2$, sprung speed $S_2$ ($d^2x_2/dt^2$), and stroke speed Ss ($d^2x_2/dt^2 - d^2x_1/dt^2$) can be calculated by obtaining outputs of first to fourth observation matrices 43 to 46 from the single-wheel model 38. The first observation matrix 43 is an unsprung location observation matrix and is [1 0 0 0]. The second observation matrix 44 is a sprung location observation matrix and is [0 1 0 0]. The third observation matrix 45 is a sprung speed observation matrix and is [0 0 0 1]. The fourth observation matrix 46 is a stroke speed observation matrix and is [0 0 -1 1]. That is, the first to fourth observation matrices 43 to 46 in the single-wheel model 38 are units for calculating the unsprung location $x_1$, sprung location $x_2$, sprung speed $S_2$, and stroke speed Ss, respectively, on the basis of the wheel speed variation ΔVw.

Inputting the unsprung weight $u_1$ calculated on the basis of the wheel speed Vw into the single-wheel model 38 enables the sprung speed $S_2$ and stroke speed Ss to be calculated, independently of whether a caster angle is set in the suspension 7. Because the sprung speed $S_2$ and stroke speed Ss can be calculated from the unsprung weight $u_1$, it is not necessary to provide the car V with a vertical G sensor or a stroke sensor, and the cost of the suspension control apparatus 20 can be reduced.

Referring back to FIG. 4, the single-wheel model calculating unit 33 includes a proportional-integral-derivative (PID) circuit 47 as a feedback unit that feeds back the unsprung location $x_1$ and sprung location $x_2$ calculated in the single-wheel model 38. With this feedback, the unsprung location $x_1$ and sprung location $x_2$ calculated by the single-wheel model calculating unit 33 are corrected on the basis of deviation of the unsprung location $x_1$ and sprung location $x_2$ calculated in the single-wheel model 38 from an unsprung reference location $x_10$ (=0) or a sprung reference location $x_20$ (=0), and the sprung location $x_2$ and unsprung location $x_1$ in a normal state, such as a constant-speed straight run on a flat road, in the single-wheel model 38 converge to a reference location (initial value).

Because the unsprung weight $u_1$ is adjusted with reference to the reference location, even when an input offset on one side continues, offsetting the entire system suppresses an error occurring in the sprung speed $S_2$ and stroke speed Ss. In addition, this makes it possible to use data on other control systems.

In this way, the single-wheel model calculating unit 33 functions as a location calculating unit that calculates the unsprung location $x_1$ and sprung location $x_2$ by obtaining outputs of the first observation matrix 43 and second observation matrix 44 from the single-wheel model 38 using the unsprung weight $u_1$ and the damping force $u_2$ of the damper 6 as inputs. Here, the single-wheel model calculating unit 33 is configured such that the PID circuit 47 feeds back both the unsprung location $x_1$ and sprung location $x_2$. Alternatively, the single-wheel model calculating unit 33 may be configured such that at least one of the unsprung location $x_1$ and sprung location $x_2$ is fed back and the unsprung location $x_1$ and sprung location $x_2$ are corrected. The sprung speed $S_2$ and stroke speed Ss calculated in the single-wheel model calculating unit 33 are input into the skyhook control unit 90, as illustrated in FIG. 3.

Four-Wheel Model Calculating Unit 34

As illustrated in FIG. 4, the four-wheel model calculating unit 34 included in the state quantity calculating unit 31 includes a pitch angle speed calculating unit 48 and a roll angle speed calculating unit 49. The pitch angle speed calculating unit 48 receives the unsprung weight $u_1$ output from the gain circuit 37. The pitch angle speed calculating unit 48 calculates the acceleration and deceleration (longitudinal acceleration Gx) of the car V on the basis of the input unsprung weight $u_1$ of each wheel (on the basis of the wheel speed Vw) and determines a pitch angle speed ωp on the basis of the calculated acceleration and deceleration, suspension characteristics, sprung weight $M_2$, or other factors. The roll angle speed calculating unit 49 receives the lateral acceleration Gy detected by the lateral G sensor 10. The roll angle speed calculating unit 49 determines a roll angle speed ωr on the basis of the input lateral acceleration Gy, suspension characteristics, sprung weight $M_2$, or other factors. As illustrated in FIG. 3, the pitch angle speed ωp is input into a pitch control unit 91, and the roll angle speed ωr is input into a roll control unit 92.

Slip Determining Unit 50

The slip determining unit 50 receives the wheel speed Vw output from the subtractor 35, that is, deviation of the wheel speed Vw of each wheel from the estimated vehicle body speed Vb. The slip determining unit 50 determines whether the absolute value of the input wheel speed Vw (deviation) is equal to or larger than a predetermined value, that is, whether the wheel speed Vw detected by the wheel speed sensor 9 deviates from the vehicle body speed Vb by a predetermined value or more. When it is equal to or larger than the predetermined value, the slip determining unit 50 determines that the corresponding wheel 3 is in a slipping state, and outputs a slip signal SS. The output slip signal SS is input into the vehicle behavior control unit (not illustrated) controlling the ABS, TCS, and VSA. When actuating one of the ABS, TCS, and VSA in response to the slip signal SS, the vehicle behavior control unit inputs an actuation signal indicating that actuation into the input unit 21.

Vehicle Body Speed Estimating Unit 32

Figure 3:
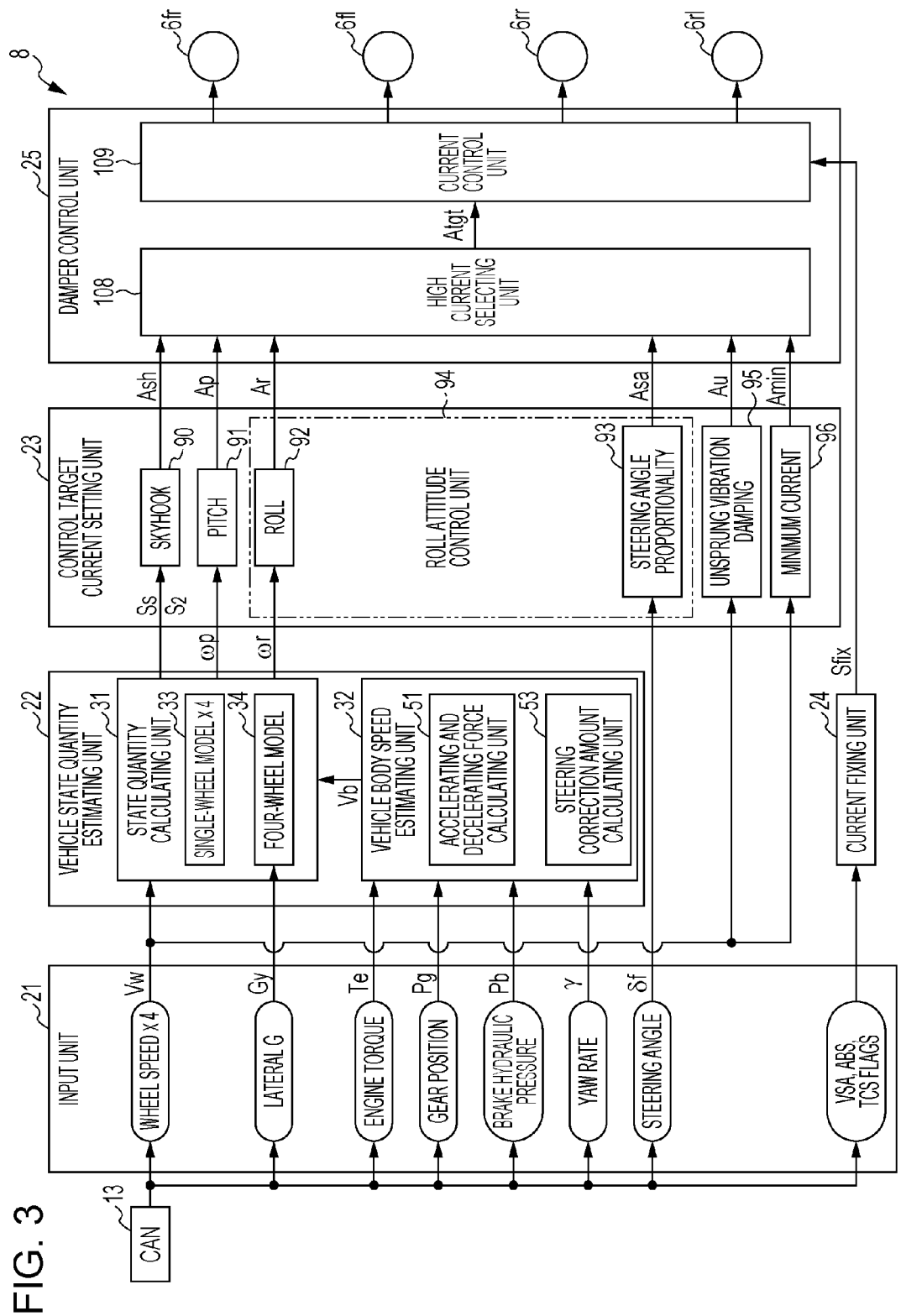
FIG. 3 is a block diagram that illustrates a schematic configuration of the suspension control apparatus illustrated in FIG. 1.
Figure 8:
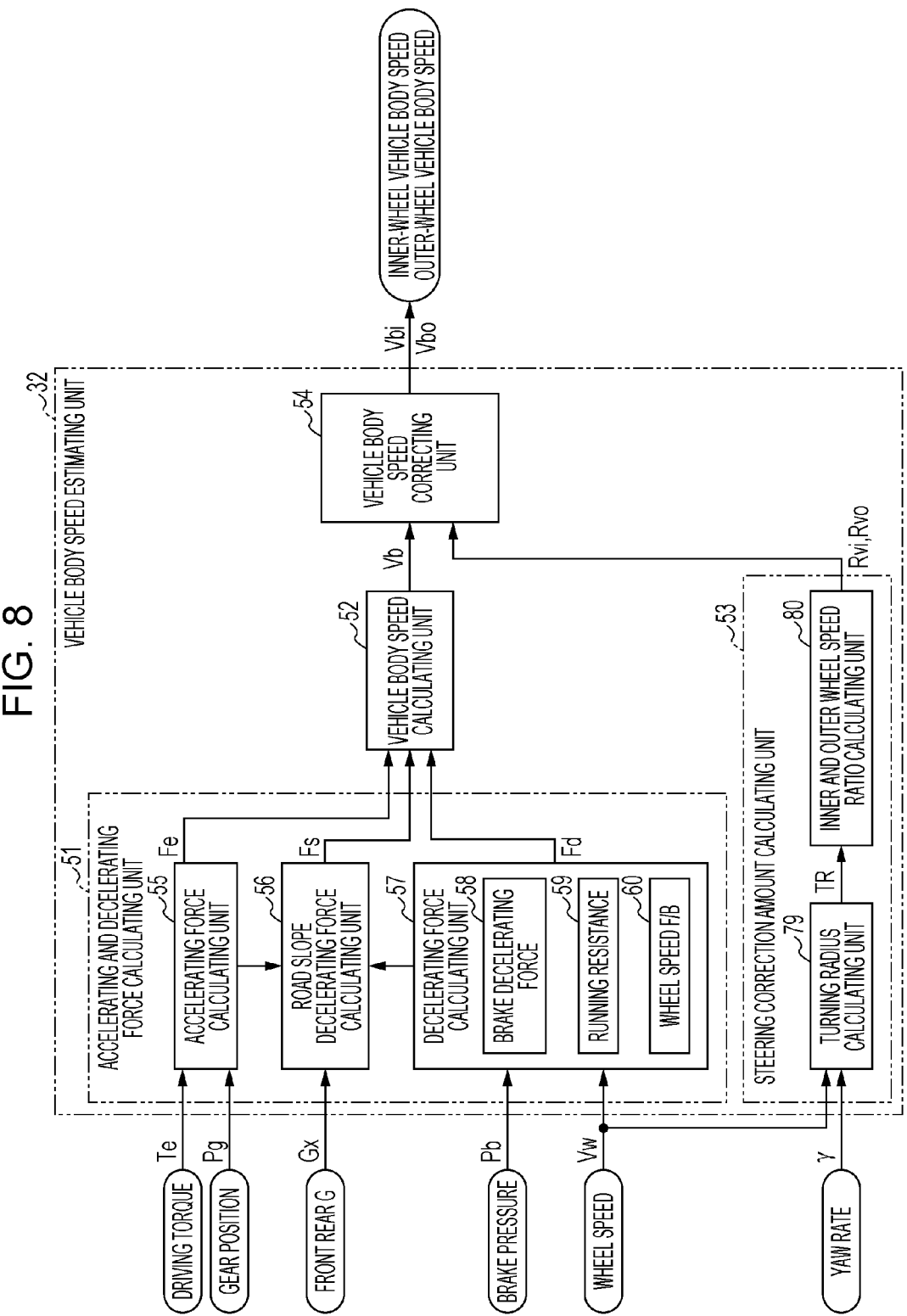
FIG. 8 is a block diagram of a vehicle body speed estimating unit illustrated in FIG. 3.

The vehicle body speed estimating unit 32 illustrated in FIG. 3 includes the accelerating and decelerating force calculating unit 51, a vehicle body speed calculating unit 52, the steering correction amount calculating unit 53, and a vehicle body speed correcting unit 54, as illustrated in FIG. 8. The accelerating and decelerating force calculating unit 51 calculates the accelerating and decelerating force F (Fe, Fs, Fd) of the car V. The vehicle body speed calculating unit 52 calculates the vehicle body speed Vb on the basis of the accelerating and decelerating force calculated by the accelerating and decelerating force calculating unit 51. The steering correction amount calculating unit 53 calculates the amount of correction resulting from a steering operation (inner-wheel vehicle body ratio Rvi and outer-wheel vehicle body ratio Rvo, which are described below). The vehicle body speed correcting unit 54 corrects the vehicle body speed Vb on the basis of the amount of correction calculated by the steering correction amount calculating unit 53.

The accelerating and decelerating force calculating unit 51 includes an accelerating force calculating unit 55 that calculates the driving force Fe (accelerating force) of the car V produced by an output of a power unit, such as an engine or a motor, a road slope decelerating force calculating unit 56 that calculates the decelerating force Fs of the car V resulting from a road slope, and a decelerating force calculating unit 57 that calculates the decelerating force Fd of the car V resulting from an element other than the road slope.

The accelerating force calculating unit 55 receives the driving torque Te detected by the torque sensor and gear position Pg and calculates the driving force Fe of the car V produced by an output of the power unit.

The road slope decelerating force calculating unit 56 calculates the decelerating force Fs resulting from the road slope. The decelerating force Fs may be calculated by, for example, obtaining the first accelerating and decelerating force by subtracting the decelerating force Fd calculated by the decelerating force calculating unit 57 from the driving force Fe calculated by the accelerating force calculating unit 55, then subtracting, from the first accelerating and decelerating force, the second accelerating and decelerating force obtained by multiplying a detected longitudinal acceleration G×d detected by a longitudinal G sensor by the vehicle body weight M.

The decelerating force calculating unit 57 includes a brake decelerating force calculating unit 58, a running resistance calculating unit 59, and a feedback resistance calculating unit 60. The brake decelerating force calculating unit 58 receives the brake hydraulic pressure Pb of the brake device and calculates the decelerating force of the car V relating to a braking operation that increases in proportional to the brake hydraulic pressure Pb. The running resistance calculating unit 59 calculates the decelerating force relating to the running resistance resulting from the vehicle body shape and a roughly estimated vehicle body speed by using the mean value of the wheel speed Vw as the roughly estimated vehicle body speed. The feedback resistance calculating unit 60 calculates the running resistance using the wheel speed feedback. The decelerating force calculating unit 57 adds the calculation results of the brake decelerating force calculating unit 58, running resistance calculating unit 59, and feedback resistance calculating unit 60 to calculate the decelerating force Fd of the car V resulting from an element other than the road slope.

The vehicle body speed calculating unit 52 subtracts the decelerating force Fs calculated by the road slope decelerating force calculating unit 56 and the decelerating force Fd calculated by the decelerating force calculating unit 57 from the driving force Fe calculated by the accelerating force calculating unit 55 to calculate the accelerating and decelerating force F of the vehicle body 1. After that, the vehicle body speed calculating unit 52 determines the acceleration by dividing the calculated accelerating and decelerating force F by the vehicle body weight M, integrates the obtained acceleration, and thus calculates the vehicle body speed Vb. The calculated vehicle body speed Vb is input into the vehicle body speed correcting unit 54.

Figure 9:
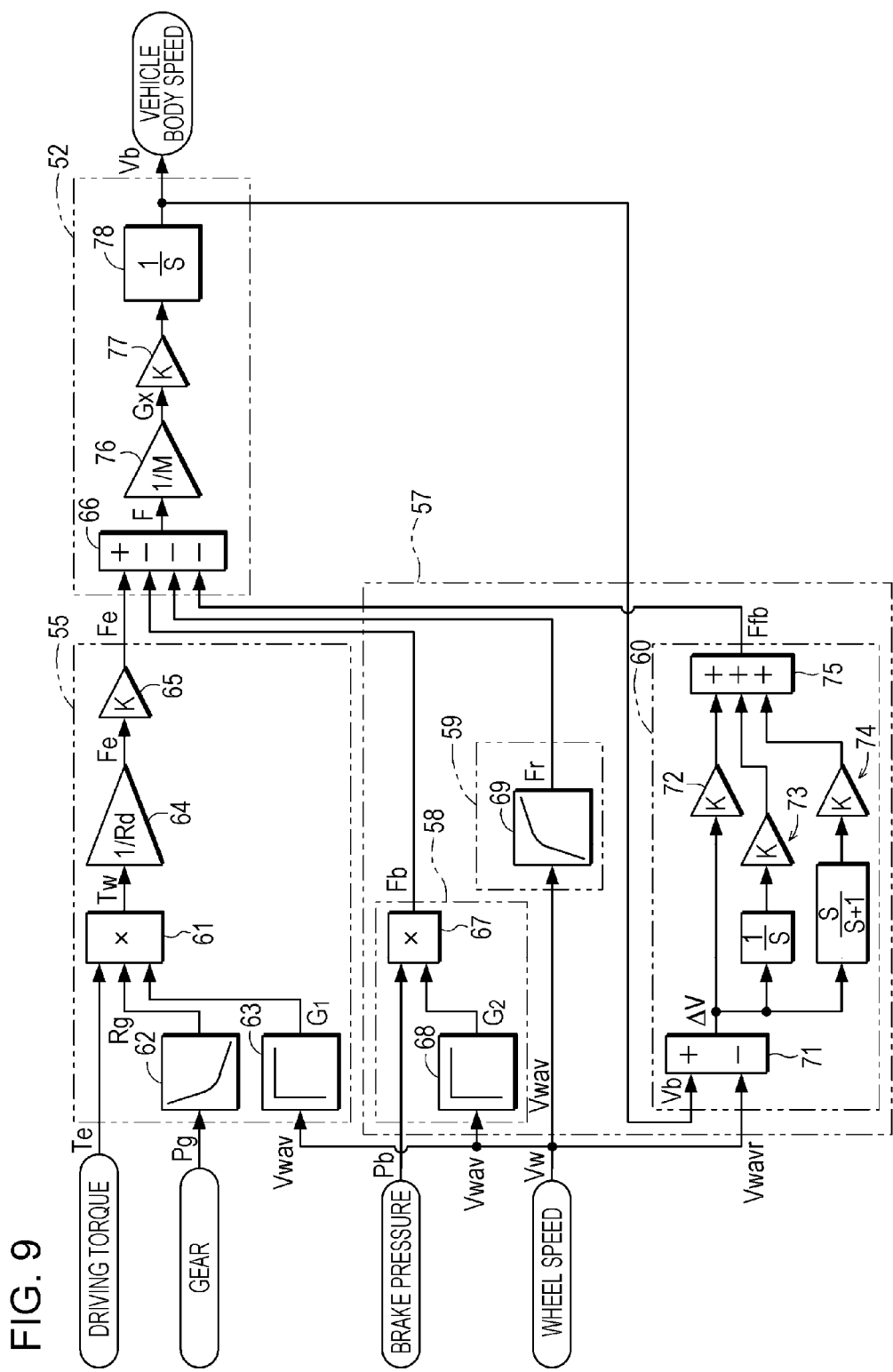
FIG. 9 is a block diagram that illustrates a main control part of the vehicle body speed estimating unit illustrated in FIG. 8.

Here, a process performed in the accelerating force calculating unit 55 and decelerating force calculating unit 57 is described in detail with reference to FIG. 9. The driving torque Te is input into a multiplier 61. The gear position Pg is input into a gear position-to-transmission gear ratio converting circuit 62. The gear position-to-transmission gear ratio converting circuit 62 determines a transmission gear ratio Rg by referring to a table on the basis of the gear position Pg and outputs it to the multiplier 61. The multiplier 61 also receives a first wheel speed gain $G_1$ from a first wheel speed gain setting circuit 63, which is described below.

The first wheel speed gain $G_1$ is set by the first wheel speed gain setting circuit 63 referring to a reference table on the basis of a mean wheel speed Vwav. The mean wheel speed Vwav is the mean value of the wheel speed of the wheel 3 detected by each of the wheel speed sensors 9. In this example, the first wheel speed gain $G_1$ is zero in a region where the mean wheel speed Vwav is very small, and the first wheel speed gain $G_1$ is substantially constant in the case where the mean wheel speed Vwav is larger than a predetermined threshold. The multiplier 61 calculates a wheel torque Tw, the wheel torque Tw being an output of the driving wheel, by multiplying the driving torque Te, transmission gear ratio Rg, and first wheel speed gain $G_1$. The wheel torque Tw is input into a torque-to-driving force converting circuit 64. The wheel torque Tw is converted into the driving force Fe of the car V by being divided by the dynamic load radius Rd of the tire 2, and the driving force Fe is output. The output driving force Fe is input into a subtractor 66 through a gain circuit 65.

The subtractor 66 receives a braking force Fb, a running resistance Fr, and a feedback resistance Ffb, which are described below, in addition to the driving force Fe output from the gain circuit 65.

The brake hydraulic pressure Pb is input into a multiplier 67. The multiplier 67 also receives a second wheel speed gain $G_2$ from a second wheel speed gain setting circuit 68. The second wheel speed gain $G_2$ is set by the second wheel speed gain setting circuit 68 referring to a reference table on the basis of the mean wheel speed Vwav. In this example, the second wheel speed gain $G_2$ is zero in a region where the mean wheel speed Vwav is very small, and the second wheel speed gain $G_2$ is substantially constant in the case where the mean wheel speed Vwav is larger than a predetermined threshold. The multiplier 67 calculates the braking force Fb corresponding to the braking force exerted by the brake device by multiplying the brake hydraulic pressure Pb and the second wheel speed gain $G_2$. Then, the braking force Fb, which indicates a positive value, is input into the subtractor 66 as a subtracting value.

The mean wheel speed Vwav is input into a running resistance setting circuit 69. The running resistance setting circuit 69 sets the running resistance Fr dependent on the vehicle speed (mean wheel speed Vwav) by referring to a reference table on the basis of the input mean wheel speed Vwav. The running resistance Fr, which indicates a positive value, calculated by the running resistance setting circuit 69 is input into the subtractor 66 as a subtracting value.

In addition, a mean rear wheel speed Vwavr is input into the feedback resistance calculating unit 60. The mean rear wheel speed Vwavr is the mean value of the wheel speed of the rear wheel 3r, which is a driven wheel. The feedback resistance calculating unit 60 includes a proportional circuit 72, an integrating circuit 73, and a differentiating circuit 74. The proportional circuit 72 sets a running resistance based on a proportional gain on the basis of a deviation ΔV obtained by subtracting the mean rear wheel speed Vwavr from the vehicle body speed Vb input into a subtractor 71. The integrating circuit 73 sets the running resistance based on an integral gain on the basis of the deviation ΔV. The differentiating circuit 74 sets the running resistance based on a differential gain on the basis of the deviation ΔV. The outputs of the proportional circuit 72, integrating circuit 73, and differentiating circuit 74 are input into an adder 75 and are added together. The adder 75 outputs the feedback resistance Ffb, which is a correction value based on the feedback of the vehicle body speed Vb. The output feedback resistance Ffb is input into the subtractor 66 as a subtracting value.

The subtractor 66 subtracts the braking force Fb, running resistance Fr, feedback resistance Ffb, and decelerating force Fs (not illustrated in FIG. 9) resulting from the road slope illustrated in FIG. 8 from the driving force Fe and outputs the accelerating and decelerating force F to an accelerating and decelerating force-to-acceleration and deceleration converting circuit 76. The accelerating and decelerating force F is converted into the acceleration and deceleration (longitudinal acceleration Gx) of the car V by being divided by the vehicle body weight M. The acceleration and deceleration of the car V is input into an integrator 78 through a gain circuit 77, and it is integrated and output as the vehicle body speed Vb.

In this way, calculating the vehicle body speed Vb of the car V on the basis of the driving force Fe, braking force Fb, running resistance Fr, and feedback resistance Ffb enables the vehicle body speed Vb for use in correcting the wheel speed Vw to be determined.

Referring back to FIG. 8, the steering correction amount calculating unit 53 includes a turning radius calculating unit 79 and an inner and outer wheel speed ratio calculating unit 80. The turning radius calculating unit 79 calculates a turning radius TR of the car V on the basis of the wheel speed Vw of each wheel and yaw rate γ. The inner and outer wheel speed ratio calculating unit 80 calculates the quantity of state of turning as the amount of correction, that is, the inner-wheel vehicle body ratio Rvi and outer-wheel vehicle body ratio Rvo on the basis of a tread T of the car V and the calculated turning radius TR. The inner-wheel vehicle body ratio Rvi and outer-wheel vehicle body ratio Rvo are ratios of the vehicle body portions corresponding to the inner wheel and outer wheel, respectively, to the vehicle body speed Vb.

Figure 10:
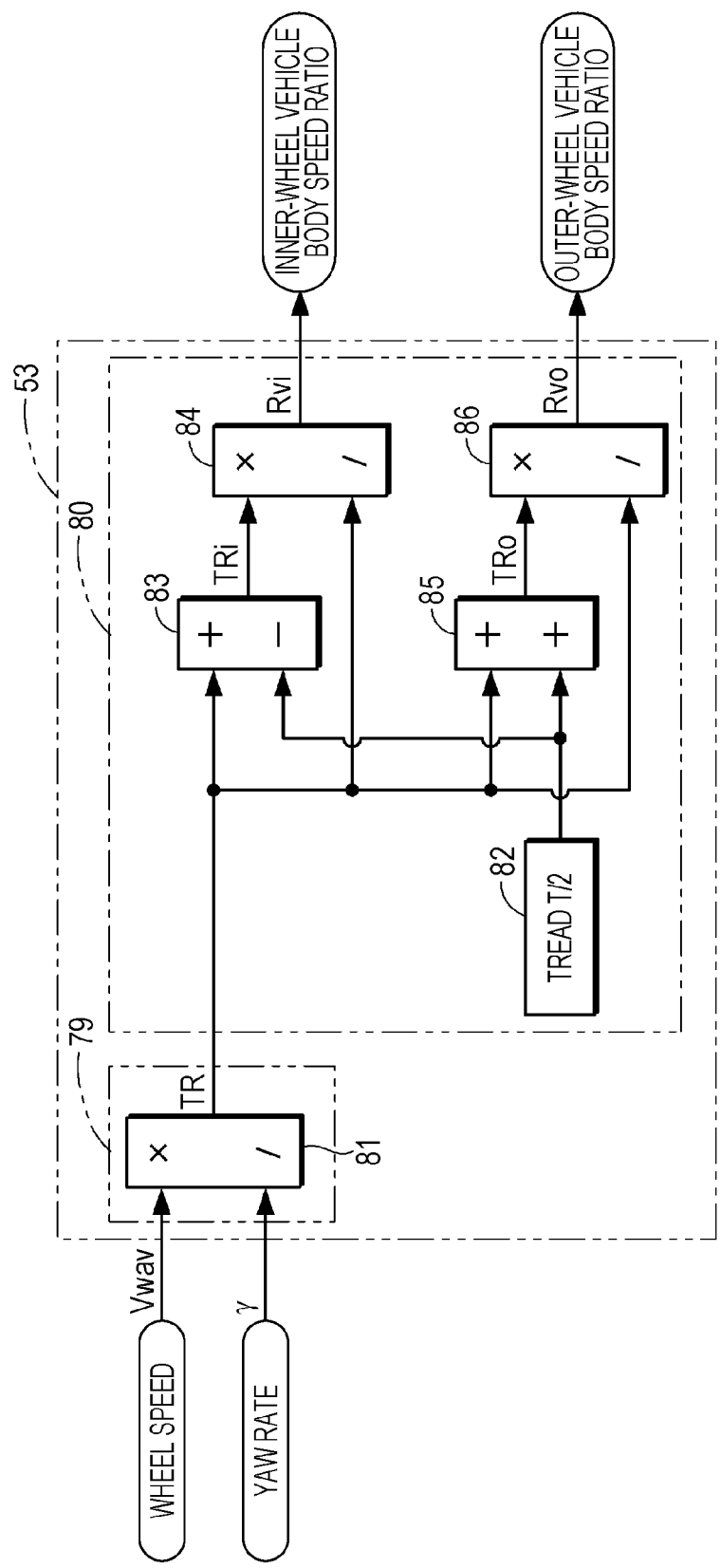
FIG. 10 is a block diagram of a steering correction amount calculating unit illustrated in FIG. 8.

A process performed by the steering correction amount calculating unit 53 is described in detail with reference to FIG. 10. The mean wheel speed Vwav of the wheel speed Vw detected by each of the wheel speed sensors 9 is input into a divider 81 as a dividend (numerator). The divider 81 also receives the yaw rate γ, which is a value detected by the yaw rate sensor 11, as a divisor (denominator). The divider 81 calculates the turning radius TR of the car V by dividing the mean wheel speed Vwav of each wheel by the yaw rate γ. If the yaw rate γ is zero in the division, the value is regulated by a known method, such as substitution of a constant. The calculated turning radius TR is input into each of a subtractor 83 and an adder 85 as an adding value. The subtractor 83 calculates an inner-wheel turning radius TRi by subtracting half the tread T stored in a memory 82 from the input turning radius TR. The adder 85 calculates an outer-wheel turning radius TRo by adding half the tread T in the memory 82 to the input turning radius TR. The output of the subtractor 83 and that of the adder 85 are input into dividers 84 and 86, respectively, as dividends. The dividers 84 and 86 also receive the turning radius TR of the car V calculated by the divider 81 as a divisor. The dividers 84 and 86 calculate the inner-wheel vehicle body ratio Rvi and outer-wheel vehicle body ratio Rvo, respectively, by dividing the inner-wheel turning radius TRi and the outer-wheel turning radius TRo, respectively, by the turning radius TR of the car V.

The inner-wheel vehicle body ratio Rvi and outer-wheel vehicle body ratio Rvo calculated by the dividers 84 and 86, respectively, are input into the vehicle body speed correcting unit 54, as illustrated in FIG. 8. The vehicle body speed correcting unit 54 multiplies each of the inner-wheel vehicle body ratio Rvi and outer-wheel vehicle body ratio Rvo by the vehicle body speed Vb, thereby calculating the inner-wheel vehicle body speed Vbi, which is the vehicle body speed Vb of the vehicle body portion corresponding to the inner wheel, and the outer-wheel vehicle body speed Vbo, which is the vehicle body speed Vb of the vehicle body portion corresponding to the outer wheel. That is, the vehicle body speed correcting unit 54 is a correcting unit that corrects the vehicle body speed Vb on the basis of the inner-wheel vehicle body ratio Rvi and outer-wheel vehicle body ratio Rvo.

In this way, correcting the vehicle body speed Vb in accordance with the turning state of the car V enables the vehicle body speed Vb on the inner-wheel side (Vbi) and that on the outer-wheel side (Vbo), which vary with the steering operation by a driver, to be accurately calculated.

The inner-wheel vehicle body speed Vbi and outer-wheel vehicle body speed Vbo are input into the state quantity calculating unit 31, more specifically, into the subtractor 35, which is disposed upstream of the band-pass filter 36, as adding values, as illustrated in FIG. 4. The inner-wheel vehicle body speed Vbi and outer-wheel vehicle body speed Vbo are used in calculating the wheel speed variation ΔVw on the basis of the wheel speed Vw and are used in removing a wheel speed variation component of the car V and a vehicle body speed variation component arising from the difference between the trajectory lengths resulting from the difference between the turning radius of the inner wheel and that of the outer wheel.

In this way, subtraction of the inner-wheel vehicle body speed Vbi or outer-wheel vehicle body speed Vbo from the input wheel speed Vw in the state quantity calculating unit 31 removes the influence of the braking/driving force of the car V from the wheel speed Vw. Accordingly, the quantity of state (sprung speed $S_2$ and stroke speed Ss) of the car V can be calculated with higher precision. In addition, correcting the vehicle body speed Vb on the basis of the inner-wheel vehicle body ratio Rvi and outer-wheel vehicle body ratio Rvo by the vehicle body speed correcting unit 54 enables the vehicle body speed Vb corresponding to each wheel to be calculated with high precision and the influence of turning of the car V on the wheel speed Vw to be removed. Accordingly, the quantity of state of the car V can be calculated with higher precision.

Figure 11A:
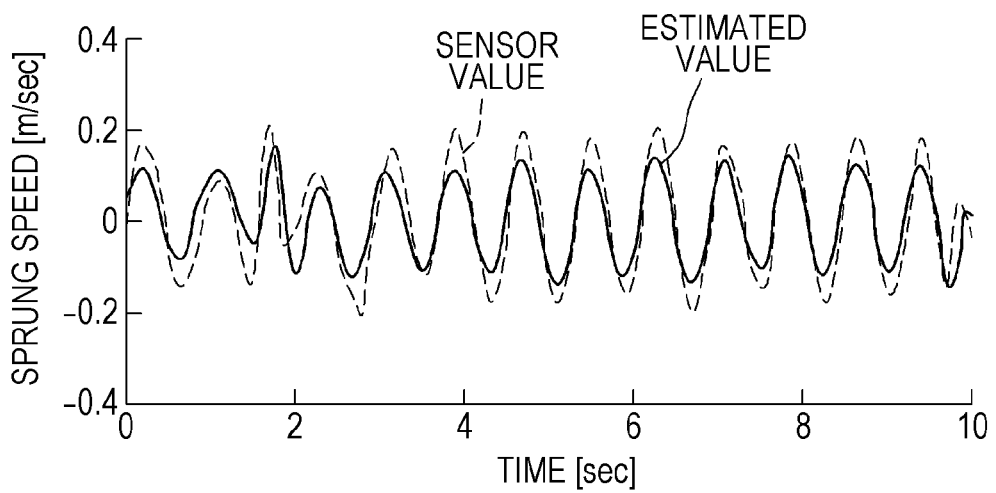
FIG. 11A is a timing chart that illustrates a comparison between an estimated value and a sensor-detected value of a sprung speed in the single-wheel model illustrated in FIG. 4.
Figure 11B:
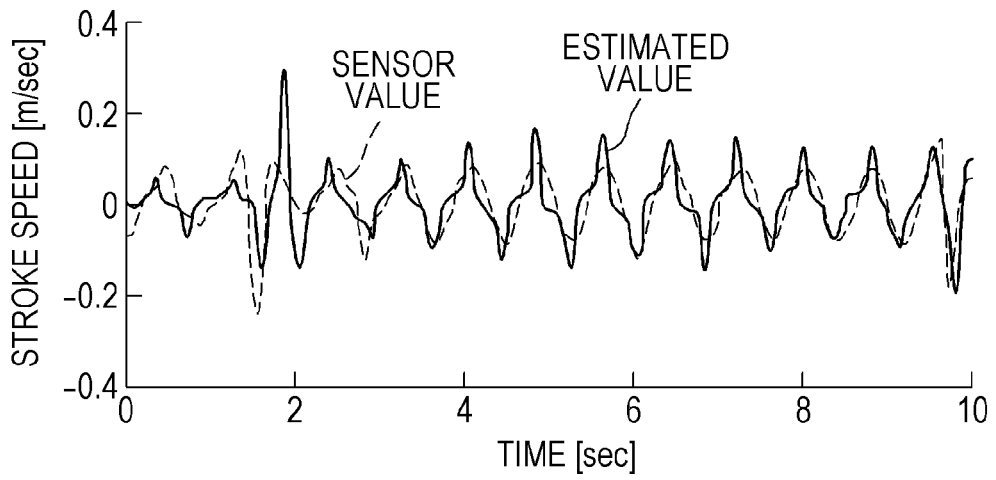
FIG. 11B is a timing chart that illustrates a comparison between an estimated value and a sensor-detected value of a stroke speed in the single-wheel model illustrated in FIG. 4.

FIG. 11A is a timing chart that illustrates a sprung speed detected by the sensor with the broken line and a sprung speed $S_2$ calculated by the state quantity calculating unit 31 with the solid line. FIG. 11B is a timing chart that illustrates a stroke speed detected by the sensor with the broken line and a stroke speed Ss calculated by the state quantity calculating unit 31 with the solid line. FIGS. 11A and 11B reveal that the calculated stroke speed Ss and sprung speed $S_2$ are approximately equal to the sensor-detected values and that the state quantity calculating unit 31 can calculate the stroke speed Ss and sprung speed $S_2$ with high precision on the basis of the wheel speed Vw. In the present embodiment, the unsprung weight $u_1$ is calculated on the basis of the wheel speed Vw, and the unsprung weight $u_1$ is an input into the vehicle model. Accordingly, the sprung speed $S_2$ and stroke speed Ss can be calculated, independently of whether a caster angle is set in the suspension 7.

Control Target Current Setting Unit 23

As illustrated in FIG. 3, the control target current setting unit 23 includes the skyhook control unit 90, the pitch control unit 91, the roll control unit 92, a steering angle proportionality control unit 93, an unsprung vibration damping control unit 95, and a minimum target current control unit 96. The skyhook control unit 90 performs skyhook control and sets a skyhook control target current Ash. The pitch control unit 91 performs pitch control based on the pitch angle speed ωp and sets a pitch control target current Ap. The roll control unit 92 performs roll control based on the roll angle speed ωr and sets a roll control target current Ar. The steering angle proportionality control unit 93 performs roll control based on the steering angle δf and sets a steering-angle-proportional control target current Asa. The unsprung vibration damping control unit 95 performs vibration damping control for the unsprung portion of the car V and sets an unsprung vibration damping control target current Au. The minimum target current control unit 96 sets a minimum target current Amin for use in producing a minimum damping force dependent on the vehicle speed.

The skyhook control unit 90 performs riding comfort control of increasing the riding comfort by suppressing sway of the vehicle when the vehicle runs over bumps and dips of a road surface (vibration damping control). The pitch control unit 91 performs vehicle body posture control of stabilizing the posture of the vehicle body 1 by suppressing pitching of the car V occurring during sudden acceleration or deceleration. The roll control unit 92 and steering angle proportionality control unit 93 constitute a roll posture control unit 94. The roll posture control unit 94 performs vehicle body posture control of stabilizing the posture of the vehicle body 1 by suppressing rolling of the car V during turning. The unsprung vibration damping control unit 95 operates to increase the grounding of the wheels 3 and the riding comfort by suppressing the unsprung oscillations in the resonance range.

Skyhook Control Unit 90

Figure 12:
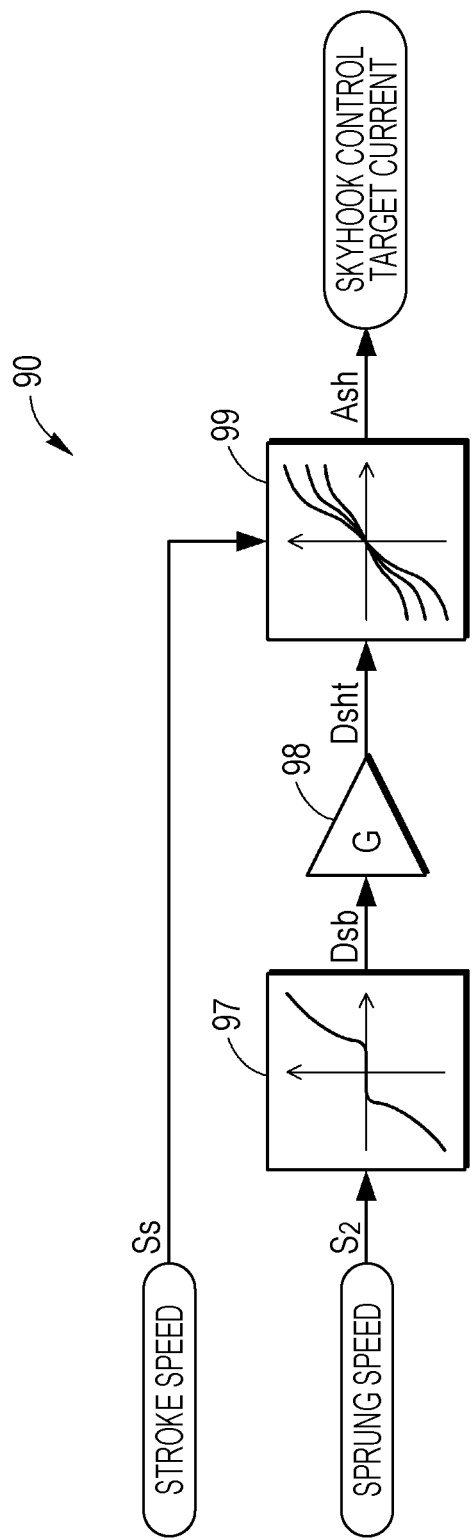
FIG. 12 is a block diagram of a skyhook control computing unit illustrated in FIG. 1.
Figure 13:
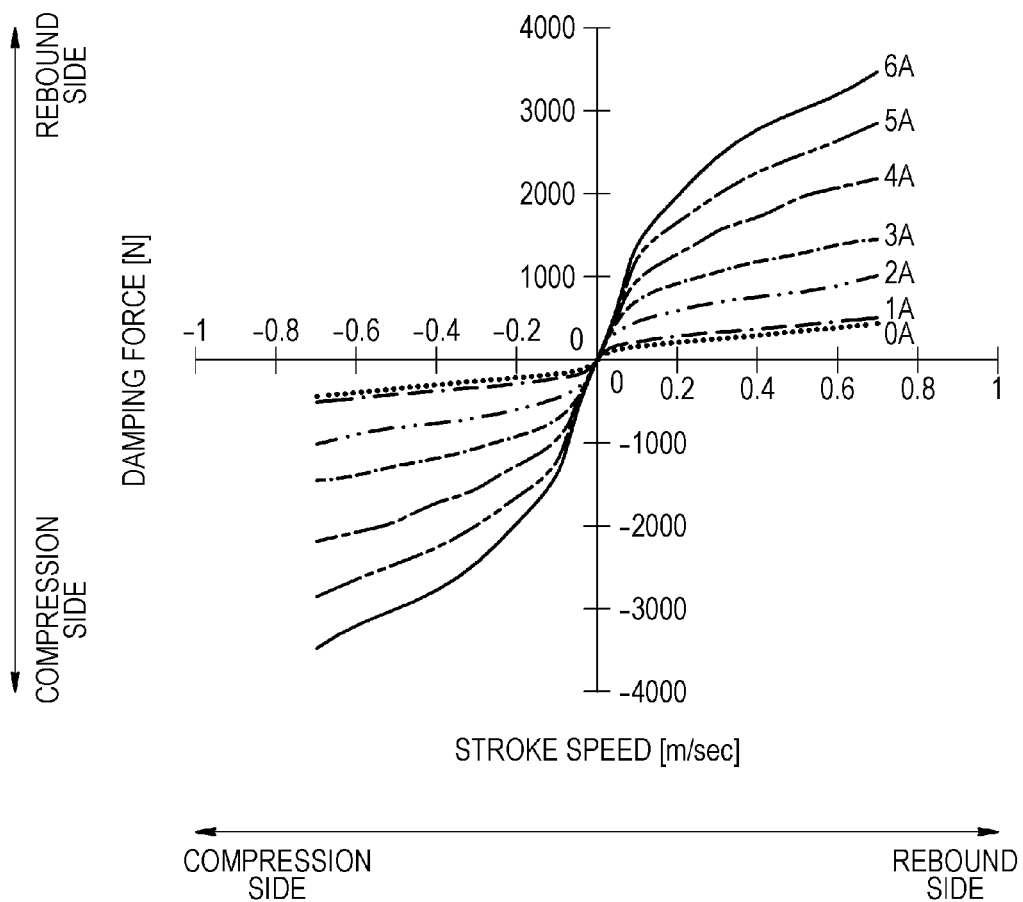
FIG. 13 is a target current map used by a target current setting unit illustrated in FIG. 12.

Next, a process performed by the skyhook control unit 90 is described in detail with reference to FIGS. 12 and 13. The skyhook control unit 90 includes a damping force base value calculating unit 97. The damping force base value calculating unit 97 receives the sprung speed $S_2$ calculated by the state quantity calculating unit 31 illustrated in FIG. 3. The damping force base value calculating unit 97 calculates a damping force base value Dsb by referring to a sprung-damping force map on the basis of the input sprung speed $S_2$. The calculated damping force base value Dsb is input into a gain circuit 98. The gain circuit 98 calculates a skyhook target damping force Dsht by multiplying the damping force base value Dsb by a skyhook gain Gsh. The calculated skyhook target damping force Dsht is input into a target current setting circuit 99. The target current setting circuit 99 also receives the stroke speed Ss. The target current setting circuit 99 sets the skyhook control target current Ash for each of the dampers 6 by referring to the current map illustrated in FIG. 13 on the basis of the skyhook target damping force Dsht and stroke speed Ss and outputs the skyhook control target current Ash.

Unsprung Vibration Damping Control Unit 95

Figure 14:
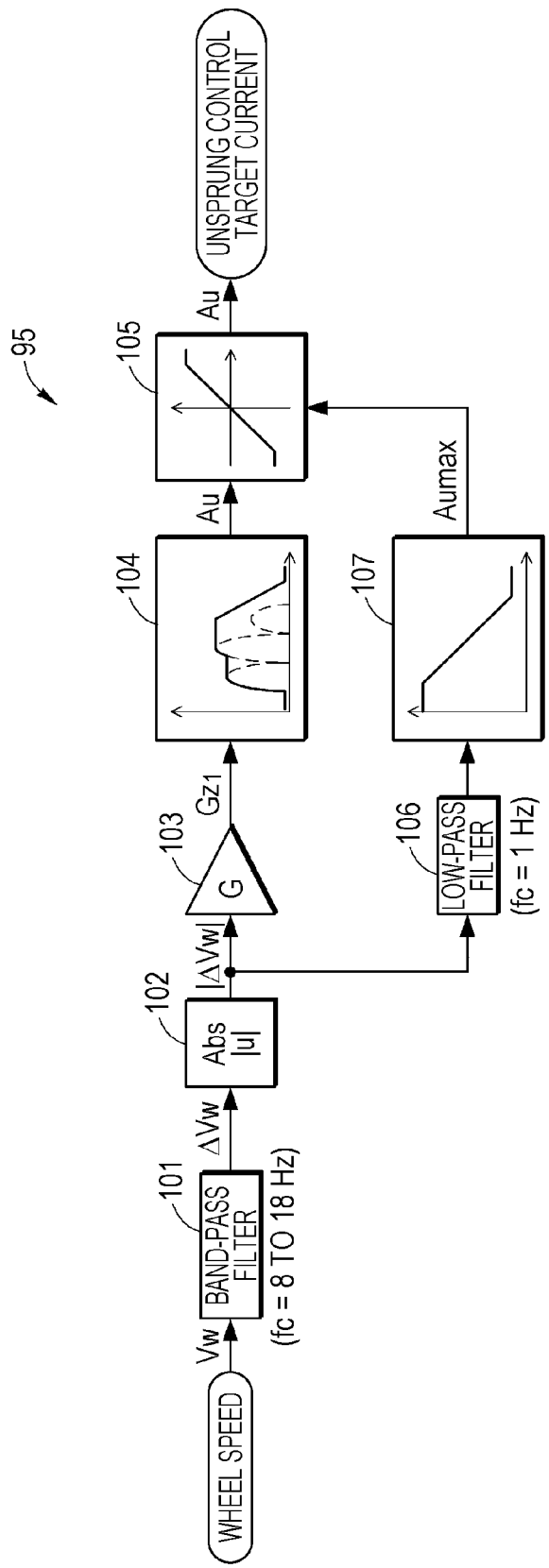
FIG. 14 is a block diagram of an unsprung vibration damping control computing unit illustrated in FIG. 1.

Next, the unsprung vibration damping control unit 95 illustrated in FIG. 3 is described in detail with reference to FIGS. 14 to 17B. As illustrated in FIG. 14, the wheel speed Vw of each wheel is input into a band-pass filter 101 in the unsprung vibration damping control unit 95. Here, the band-pass filter 101 has a band-pass characteristic of a passband of 8 to 18 Hz with the aim of allowing the wheel speed Vw signal in the resonance range of the unsprung portion to pass therethrough. Accordingly, the band-pass filter 101 extracts a signal having a frequency band higher than the 0.5 to 5 Hz frequency band of the band-pass filter 36 (FIG. 4) for use in skyhook control. The high-frequency side cut-off frequency of the band-pass filter 36 for use in skyhook control is set at 5 Hz and the low-frequency side cut-off frequency of the band-pass filter 101 for use in unsprung vibration damping control is set at 8 Hz such that there is a band gap between the band-pass filters 36 and 101 which prevents mutual interference between the skyhook control and unsprung vibration damping control.

The wheel speed Vw signal input from the CAN 13 also contains a signal other than the one in the resonance range of the unsprung portion. For example, the wheel speed Vw signal with a frequency characteristic illustrated in FIG. 15A obtained while the vehicle runs at a speed of 40 kpm contains the wheel speed Vw signal in the resonance range of the unsprung portion illustrated in FIG. 15B. In this case, causing the wheel speed Vw signal to pass through the band-pass filter 101 corresponding to the resonance range of the unsprung portion enables the wheel speed Vw signal containing the unsprung signal component to be extracted and the DC component to be removed from the wheel speed Vw signal. That is, the band-pass filter 101 functions a wheel speed variation extracting unit that extracts the wheel speed variation ΔVw on the basis of the wheel speed Vw signal.

The wheel speed variation ΔVw having passed through the band-pass filter 101 is input into an absolute value computing circuit 102 and is converted into the absolute value of the wheel speed variation ΔVw. The wheel speed variation ΔVw is proportional to the unsprung weight $u_1$, as described above. A vertical acceleration obtained by division of the unsprung weight $u_1$ by the unsprung mass $M_1$ is also a value corresponding to the wheel speed variation ΔVw. Thus producing a damping force corresponding to the absolute value of the vertical acceleration enables the unsprung oscillations to be suppressed.

The wheel speed variation ΔVw output from the absolute value computing circuit 102 is input into a gain circuit 103. The gain circuit 103 multiplies it by a gain, thus calculating the magnitude (absolute value) of an unsprung acceleration $Gz_1$. The unsprung acceleration $Gz_1$ is a basic input amount of the car V. Specifically, the gain circuit 103 multiplies the wheel speed variation ΔVw by, as the gain, a value obtained by division of the proportionality constant k described in relation to FIG. 6 by the unsprung mass $M_1$.

The unsprung acceleration $Gz_1$ output from the gain circuit 103 is input into a target current setting circuit 104. The target current setting circuit 104 calculates a current corresponding to the unsprung acceleration $Gz_1$ and sets the unsprung vibration damping control target current Au resulting from peak-hold ramp-down control on the basis of the calculated current.

Figure 16A:
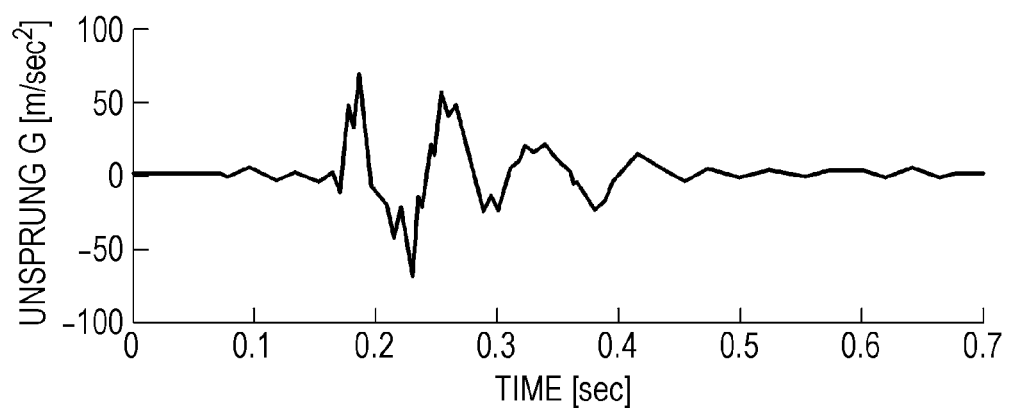
FIGS. 16A and 16B are timing charts in which an unsprung acceleration and a target current set by a peak-hold ramp-down circuit illustrated in FIG. 14 are contrasted.
Figure 16B:
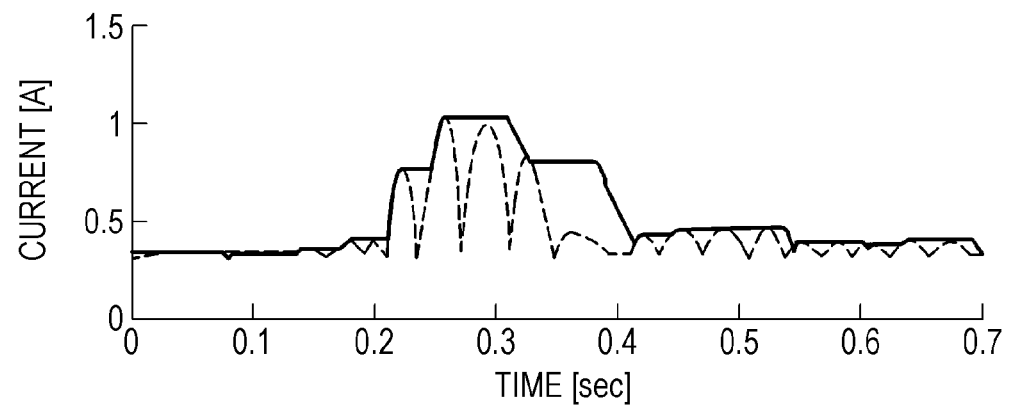

The target current setting circuit 104 sets the unsprung vibration damping control target current Au indicated by the solid line illustrated in FIG. 16B on the basis of the calculated current indicated by the broken line illustrated in FIG. 16B with respect to the input of the unsprung acceleration $Gz_1$ having the characteristic illustrated in FIG. 16A. Specifically, the target current setting circuit 104 selects the maximum value from among input calculated currents and holds it as the unsprung vibration damping control target current Au for a predetermined period of time. After the predetermined period of time has elapsed since the input of that maximum value, the target current setting circuit 104 decreases the value of the unsprung vibration damping control target current Au with a predetermined inclination. That is, when the unsprung acceleration $Gz_1$ increases, the unsprung vibration damping control target current Au is set so as to (quickly) respond to the unsprung acceleration $Gz_1$. In contrast, when the unsprung acceleration $Gz_1$ reduces, the unsprung vibration damping control target current Au is set so as to respond to it more slowly than that when it increases. This enables the unsprung oscillations to be dampened more effectively and stably than that when the unsprung vibration damping control target current Au is set at the calculated current indicated by the broken line.

Referring back to FIG. 14, the unsprung vibration damping control target current Au output from the target current setting circuit 104 is input into a control circuit 105. The control circuit 105 restricts the upper limit of the unsprung vibration damping control target current Au to an upper limit Aumax and outputs the unsprung vibration damping control target current Au. That is, when the input unsprung vibration damping control target current Au exceeds the upper limit Aumax, the control circuit 105 sets the unsprung vibration damping control target current Au at the upper limit Aumax. This can prevent the unsprung vibration damping control target current Au set in accordance with the magnitude of the wheel speed variation ΔVw from being set at a value that exceeds the upper limit Aumax set in consideration of the capacity of the power supply of the car V and the damping characteristics of the damper 6.

The wheel speed variation ΔVw output from the absolute value computing circuit 102 is also input into a low-pass filter 106, in addition to the gain circuit 103. Here, the low-pass filter 106 has a low-pass characteristic of allowing a signal in a range lower than 1 Hz to pass therethrough. An upper-limit setting circuit 107 sets the upper limit Aumax in accordance with the absolute value of the wheel speed variation ΔVw having passed through the low-pass filter 106 and inputs the upper limit Aumax into the control circuit 105. Specifically, when the absolute value exceeds a predetermined value, the upper-limit setting circuit 107 sets the upper limit Aumax at a value that reduces with an increase in the wheel speed variation ΔVw.

The control circuit 105 changes the upper limit of the unsprung vibration damping control target current Au in accordance with the input upper limit Aumax, that is, changes the upper limit Aumax such that it reduces with an increase in the absolute value of the wheel speed variation ΔVw having passed through the low-pass filter 106. Advantageous effects thereof are described below.

Figure 17A:
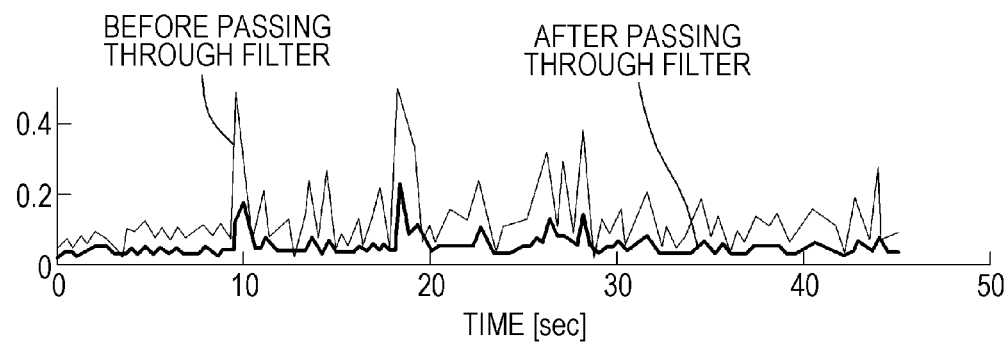
FIG. 17A is a timing chart that illustrates a variation in the wheel speed before and after low-pass filtering when a vehicle runs on a flat road.
Figure 17B:
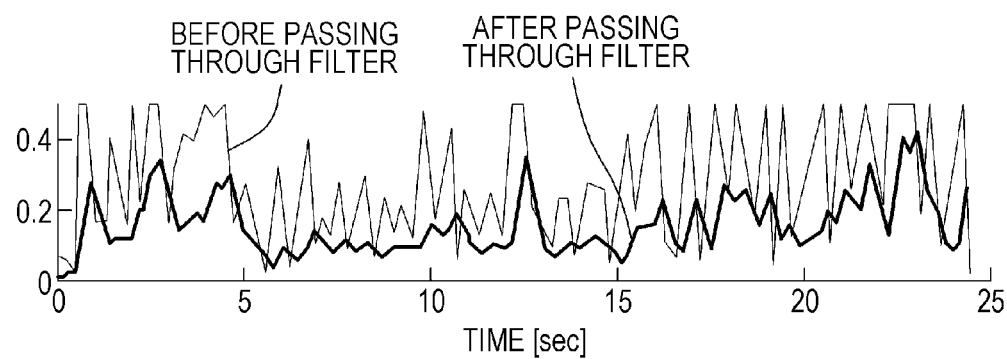
FIG. 17B is a timing chart that illustrates a variation in the wheel speed before and after low-pass filtering when a vehicle runs on a rough paved road.

For a relatively flat paved road, the wheel speed variation ΔVw (absolute value) having passed through the low-pass filter 106 indicated by the thick line illustrated in FIG. 17A is smaller than that before passing through the low-pass filter 106 indicated by the thin line, and its mean value is also smaller. In contrast to this, for a rough paved road, as illustrated in FIG. 17B, the wheel speed variation ΔVw before passing through the low-pass filter 106 indicated by the thin line is larger than that in the case of the flat road illustrated in FIG. 17A, and the wheel speed variation ΔVw having passed through the low-pass filter 106 indicated by the thick line is also larger than that illustrated in FIG. 17A. Accordingly, when the absolute value of the wheel speed variation ΔVw having passed through the low-pass filter 106 is large, the road surface is determined to be rough, and the control circuit 105 reduces the unsprung vibration damping control target current Au (weakens unsprung vibration damping control). This can prevent a decrease in the riding comfort caused by setting the unsprung vibration damping control target current Au at an excessive high value.

In this way, the unsprung vibration damping control unit 95 can be configured such that the unsprung vibration damping control target current Au is set on the basis of the wheel speed Vw signal, and the value of the unsprung vibration damping control target current Au is determined on the basis of the magnitude of the wheel speed variation ΔVw in the resonance range of the unsprung portion of the wheel speed Vw. Thus the vibration damping control can be performed on the unsprung portion without having to consider other factors such as the sprung portion.

Current Fixing Unit 24

Referring back to FIG. 3, when an actuation signal that indicates actuation of one of the VSA, ABS, and TCS is input into the input unit 21, the current fixing unit 24 determines that the behavior of the car V is unstable and outputs a current fixing signal Sfix. The output current fixing signal Sfix is input into the damper control unit 25.

Damper Control Unit 25

The damper control unit 25 includes a high current selecting unit 108 and a current control unit 109. The high current selecting unit 108 sets the target current Atgt at the maximum value selected from among the set skyhook control target current Ash, pitch control target current Ap, roll control target current Ar, steering-angle-proportional control target current Asa, unsprung vibration damping control target current Au, and minimum target current Amin.

The current control unit 109 can receive the target current Atgt and current fixing signal Sfix. When not receiving the current fixing signal Sfix, the current control unit 109 produces a driving current to be supplied to each of the dampers 6 on the basis of the target current Atgt set by the high current selecting unit 108 and controls the damping force of the damper 6. In contrast, when receiving the current fixing signal Sfix, the current control unit 109 fixes the current on the basis of the target current Atgt that is the previous one before the current fixing signal Sfix is input (that is, fixes the damping coefficient of the damper 6 at a predetermined value) to avoid a sudden change in the damping force of the damper 6, produces the driving current to be supplied to each of the dampers 6 on the basis of the fixed target current Atgt, and controls the damping force of the damper 6.

Here, the current control unit 109 maintains the target current Atgt at a constant value over a period for which the current fixing signal Sfix is input. Alternatively, the target current Atgt may be maintained constant until a predetermined period of time has elapsed from the end of an input of the fixing signal Sfix.

Procedure of Controlling Damping Force

Figure 18:
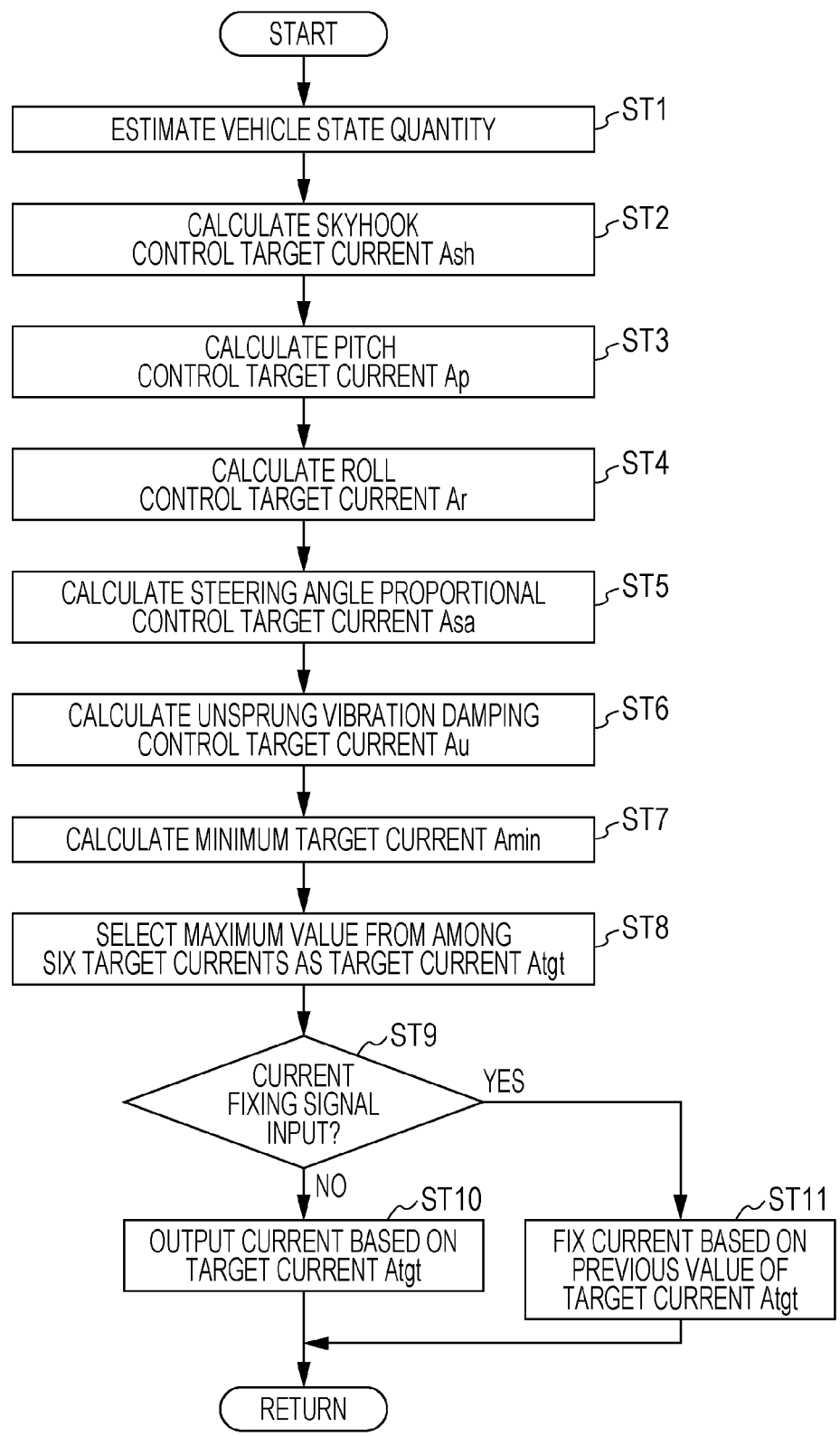
FIG. 18 is a flowchart that illustrates a procedure of controlling a damping force by the suspension control apparatus illustrated in FIG. 3.

The ECU 8 having the above-described configuration performs damping force control through the following basic procedure. That is, when the car V starts running, the ECU 8 performs the damping force control whose procedure is illustrated in the flowchart of FIG. 18 at predetermined processing intervals (for example, 10 ms). When starting the damping force control, the ECU 8 computes the unsprung weight $u_1$ of each wheel on the basis of a value detected by the wheel speed sensor 9 and other factors and computes quantities of state of movement of the car V (sprung speed $S_2$ and stroke speed Ss of each wheel, roll angle speed ωr and pitch angle speed ωp of the vehicle body 1) on the basis of the computed unsprung weight $u_1$ and a value detected by the lateral G sensor 10 (step ST1).

Then, the ECU 8 calculates the skyhook control target current Ash of each of the dampers 6 on the basis of the sprung speed $S_2$ and stroke speed Ss (step ST2), calculates the pitch control target current Ap of each of the dampers 6 on the basis of the pitch angle speed ωp of the vehicle body 1 (step ST3), calculates the roll control target current Ar of each of the dampers 6 on the basis of the roll angle speed ωr of the vehicle body 1 (step ST4), calculates the steering-angle-proportional control target current Asa of each of the dampers 6 on the basis of the steering angle δf (step ST5), calculates the unsprung vibration damping control target current Au of each of the dampers 6 on the basis of the wheel speed Vw of the corresponding wheel (step ST6), and calculates the minimum target current Amin of each of the dampers 6 on the basis of the wheel speed Vw of the corresponding wheel (step ST7). Steps ST2 through ST7 are not necessarily to be performed in this order and may be concurrently performed.

Then, the ECU 8 sets the target current Atgt for each wheel at the maximum value selected from among the six control target currents Ash, Ap, Ar, Asa, Au, and Amin (step ST8). After that, the ECU 8 determines whether the current fixing signal Sfix is input (step ST9). When the determination is NO (that is, none of the VSA, ABS, and TCS is actuated), the ECU 8 outputs the driving current to the MLV coil of each of the dampers 6 on the basis of the target current Atgt selected in step ST8 (step ST10). In this way, the optimal target damping force corresponding to the load of the damper 6 is set in the damping force control, and the steering stability and the riding comfort are improved.

When the determination in step ST9 is YES (that is, one of the VSA, ABS, and TCS is actuated), the ECU 8 outputs the driving current to the MLV coil of each of the dampers 6 on the basis of the previous value of the target current Atgt (step ST11). In this way, when one of the VSA, ABS, and TCS is actuated, an unstable vehicle behavior caused by a sudden change in the target current Atgt selected in step ST8 can be prevented.

Second Embodiment

The suspension control apparatus 20 according to a second embodiment is described below with reference to FIG. 19. In the description, the same reference numerals are used in the elements having substantially the same functions as in the first embodiment, and redundant description is omitted.
ECU 8

Figure 19:
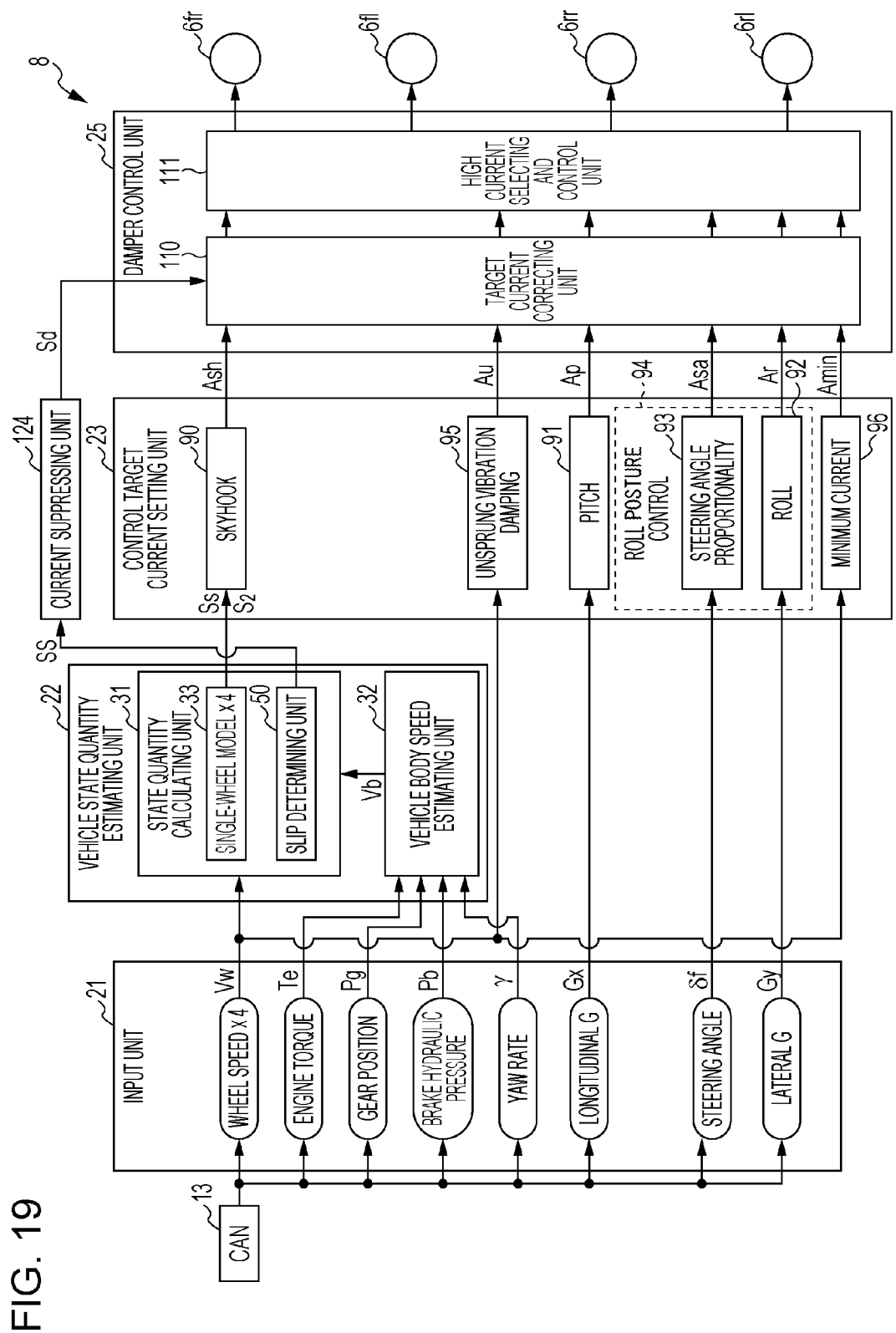
FIG. 19 is a block diagram that illustrates a schematic configuration of the suspension control apparatus according to a second embodiment.

In the present embodiment, as illustrated in FIG. 19, the input unit 21 in the ECU 8 receives a longitudinal acceleration Gx from the longitudinal G sensor (not illustrated) on the vehicle body 1, in addition to the wheel speed Vw, lateral acceleration Gy, driving torque Te, gear position Pg, brake hydraulic pressure Pb, yaw rate γ, steering angle δf, and VSA, ABS, and TCS flags described in the first embodiment.

The vehicle state quantity estimating unit 22 includes the state quantity calculating unit 31 and vehicle body speed estimating unit 32. The vehicle body speed estimating unit 32 includes the accelerating and decelerating force calculating unit 51 and steering correction amount calculating unit 53, both of which are not illustrated in FIG. 19, as in the case of the first embodiment. The state quantity calculating unit 31 does not include the four-wheel model calculating unit 34 and includes only the single-wheel model calculating unit 33 and the slip determining unit 50. The sprung speed $S_2$ and stroke speed Ss calculated by the vehicle state quantity estimating unit 22 are used in calculation of the skyhook control target current Ash by the skyhook control unit 90, as in the case of the first embodiment.

The pitch control unit 91 in the present embodiment sets the pitch control target current Ap on the basis of the differential value of the longitudinal acceleration Gx detected by the longitudinal G sensor. The roll control unit 92 sets the roll control target current Ar on the basis of the differential value of the lateral acceleration Gy detected by the lateral G sensor 10. The unsprung vibration damping control unit 95 sets the unsprung vibration damping control target current Au on the basis of the wheel speed Vw, as in the case of the first embodiment.

In the present embodiment, the ECU 8 includes a current suppressing unit 124, instead of the current fixing unit 24 in the first embodiment. An actuation signal that indicates actuation of the Abs, TCS, and VSA is not input into the input unit 21. The slip signal SS output from the slip determining unit 50 is directly input into the current suppressing unit 124. The slip signal SS is also input into the vehicle behavior control unit (not illustrated) that controls the ABS, TCS, and VSA, and the vehicle behavior control unit controls the ABS, TCS, and VSA in accordance with the slip signal SS. When receiving the slip signal SS, the current suppressing unit 124 determines that the behavior of the vehicle is unstable and outputs a suppression signal Sd for use in suppressing each of the control target currents in accordance with predetermined requirements.

The damper control unit 25 in the present embodiment includes a target current correcting unit 110 and a high current selecting and control unit 111, instead of the high current selecting unit 108 and current control unit 109 in the first embodiment. The skyhook control target current Ash, unsprung vibration damping control target current Au, pitch control target current Ap, steering-angle-proportional control target current Asa, roll control target current Ar, and minimum target current Amin set by the control target current setting unit 23 are input into the high current selecting and control unit 111 through the target current correcting unit 110.

The target current correcting unit 110 also receives the suppression signal Sd output from the current suppressing unit 124. When receiving the suppression signal Sd, the target current correcting unit 110 corrects (suppresses) the skyhook control target current Ash and unsprung vibration damping control target current Au by maintaining them at a constant value that is the previous value before the suppression signal Sd is input (that is, fixing the damping coefficient of the damper 6 at a predetermined value).

The high current selecting and control unit 111 sets the target current Atgt at the maximum value selected from among the six control target currents Ash, Au, Ap, Asa, Ar, and Amin output from the target current correcting unit 110, produces the driving current to be supplied to each of the dampers 6 on the basis of the set target current Atgt, and controls the damping force of the damper 6. In this way, the high current selecting and control unit 111 can use the skyhook control target current Ash and unsprung vibration damping control target current Au corrected by the target current correcting unit 110 as options, which can avoid a sudden change in the damping force of the damper 6 when using the skyhook control target current Ash and unsprung vibration damping control target current Au set according to the wheel speed Vw with the wheel in a slipping state.

In the present embodiment, the target current correcting unit 110 corrects only the skyhook control target current Ash and unsprung vibration damping control target current Au and does not correct the unsprung vibration damping control target current Au, pitch control target current Ap, steering-angle-proportional control target current Asa, roll control target current Ar, and minimum target current Amin. Accordingly, for example, in the case of a vehicle behavior in which the roll posture changes, adequate roll control target current Ar is output to suppress disturbance in the vehicle behavior, and thus actuation control on the VSA and others can be improved.

One variation of the target current correcting unit 110 may be the one in which when receiving the suppression signal Sd the target current correcting unit 110 maintains the skyhook control target current Ash and unsprung vibration damping control target current Au at a constant value and multiplies the pitch control target current Ap, steering-angle-proportional control target current Asa, roll control target current Ar, and minimum target current Amin by a reduction gain for use in suppressing control. This configuration enables the amount of control on the damper 6 when the vehicle behavior is unstable to be suppressed.

Alternatively, when receiving the suppression signal Sd, the target current correcting unit 110 may maintain the skyhook control target current Ash and unsprung vibration damping control target current Au at a constant value and maintain each of the pitch control target current Ap, steering-angle-proportional control target current Asa, roll control target current Ar, and minimum target current Amin at the previous value before the suppression signal Sd is input (that is, fix the damping coefficient of the damper 6 at a predetermined value). This configuration enables the amount of control when the vehicle behavior is unstable to be suppressed with stability.

In all of the above-described configurations, a period (duration) in which the current control unit 109 maintains (suppresses) each control target current at (to) a constant value can be set at a period during which the suppression signal Sd is input or at a period until a predetermined period of time has elapsed from the end of an input of the suppression signal Sd, as in the case of the first embodiment.

Control of maintaining or suppressing each control target current at or to a constant value is not limited to the configuration in which the constant value is maintained for a duration, and alternatively it may be one that suppresses the degree of control dependent on the control target current setting unit 23 by the use of the configuration in which a change in each control target current is set (fixed) such that it gradually decreases and becomes a predetermined value after a predetermined period of time, or the configuration in which a change in each control target is set (fixed) such that after it is maintained at a constant value for a predetermined period of time, it gradually decrease. In these manners, causing the amount of control to converge to a predetermined value after a predetermined period of time with stability can make the vehicle behavior stable.

Procedure of Controlling Damping Force

Next, a procedure of controlling a damping force by the ECU 8 according to a second embodiment is described with reference to FIG. 20.

When starting the damping force control, the ECU 8 computes the unsprung weight $u_1$ of each wheel on the basis of a value detected by the wheel speed sensor 9 and computes quantities of state of movement of the car V (sprung speed $S_2$ and stroke speed Ss of each wheel) on the basis of the computed unsprung weight $u_1$ (step ST21).

Then, the ECU 8 calculates the skyhook control target current Ash of each of the dampers 6 on the basis of the sprung speed $S_2$ and stroke speed Ss (step ST22), calculates the pitch control target current Ap of each of the dampers 6 on the basis of the differential value of the longitudinal acceleration Gx (step ST23), calculates the roll control target current Ar of each of the dampers 6 on the basis of the differential value of the lateral acceleration Gy (step ST24), calculates the steering-angle-proportional control target current Asa of each of the dampers 6 on the basis of the steering angle δf (step ST25), calculates the unsprung vibration damping control target current Au of each of the dampers 6 on the basis of the wheel speed Vw of the corresponding wheel (step ST26), and calculates the minimum target current Amin of each of the dampers 6 on the basis of the wheel speed Vw of the corresponding wheel (step ST27). Steps ST22 through ST27 are not necessarily to be performed in this order and may be concurrently performed.

Then, the ECU 8 determines whether the suppression signal Sd is input (step ST28). When the determination is NO (that is, the wheel is not determined to be in a slipping state), the ECU 8 sets the target current Atgt for each wheel at the maximum value selected from among the six control target currents Ash, Ap, Ar, Asa, Au, and Amin set in steps ST22 to ST27 and outputs the driving current to the MLV coil of each of the dampers 6 on the basis of the target current Atgt (step ST30). In this way, the optimal target damping force corresponding to the load of the damper 6 is set in the damping force control, and the steering stability and the riding comfort are improved.

When the determination in step ST28 is YES (that is, the wheel is determined to be in a slipping state), the ECU 8 corrects (suppresses) each of the skyhook control target current Ash and unsprung vibration damping control target current Au on the basis of the previous value (step ST29), sets the target current Atgt for each wheel at the maximum value selected from among the six control target currents Ash, Ap, Ar, Asa, Au, and Amin, and outputs the driving current to the MLV coil of each of the dampers 6 on the basis of the target current Atgt (step ST30). This can prevent an unstable vehicle behavior caused by a sudden change in the target current Atgt of each of the dampers 6 resulting from a sudden change in the skyhook control target current Ash and unsprung vibration damping control target current Au set in steps ST22 and ST26, respectively, when the wheel is in a slipping state and one of the VSA, ABS, and TCS is actuated.

The description of specific embodiments is completed. The present application is not limited to the above-described embodiments, and modifications may be made widely. For example, specific configurations and arrangement of members and portions or specific control procedures may be changed in the range that does not depart from the spirit of the present application. Not all of the elements illustrated in the above-described embodiments are necessary, and they are optional if needed.

I claim:

1. A suspension control apparatus for use in a vehicle including a variable damping force damper with a damping force adjustable in accordance with an input signal, the suspension control apparatus comprising:
   a wheel speed sensor detecting a wheel speed of each wheel of the vehicle;
   a wheel speed variation calculating unit calculating a variation in the wheel speed detected by the wheel speed sensor;

a basic input amount calculating unit calculating an unsprung weight of a suspension of the vehicle using the calculated variation in the wheel speed;

a state quantity calculating unit calculating a quantity of state of the vehicle by inputting the calculated unsprung weight into a vehicle model that represents a behavior of the vehicle;

a damper control unit performing a damper control based on the variation in the wheel speed detected by the wheel speed sensor, by controlling the damping force of the variable damping force damper, the damper control unit performing a skyhook control using the calculated quantity of the state of the vehicle;

a vehicle body speed estimating unit estimating a vehicle body speed using a vehicle body acceleration of the vehicle; and a slip determining unit determining that the wheel is in a slipping state when a value detected by the wheel speed sensor deviates from an estimated wheel speed estimated using the vehicle body speed by a predetermined value or more, wherein, when the slip determining unit determines that the wheel is in the slipping state, the damper control unit suppresses the skyhook control using the calculated quantity of the state of the vehicle.

2. The suspension control apparatus according to claim 1, wherein, when the slip determining unit determines that the wheel is in the slipping state, the damper control unit suppresses the damper control based on the variation in the wheel speed detected by the wheel speed sensor, by fixing an amount of controlling on the variable damping force damper at a predetermined amount.

3. The suspension control apparatus according to claim 1, wherein, when the slip determining unit determines that the wheel is in the slipping state, the damper control unit suppresses the damper control based on the variation in the wheel speed detected by the wheel speed sensor, by gradually decreasing an amount of controlling on the variable damping force damper from a predetermined amount.

4. The suspension control apparatus according to claim 1, further comprising:

a turning state quantity detecting unit detecting a quantity of turning state of the vehicle, wherein the damper control unit includes a roll control unit setting an amount of controlling on the variable damping force damper on the basis of the quantity of the turning state detected by the turning state quantity detecting unit, and when the slip determining unit determines that the wheel is in the slipping state, the damper control unit maintains the amount of controlling set by the roll control unit.

5. The suspension control apparatus according to claim 1, wherein the damper control unit performs the damper control based on the variation in the wheel speed, by updating a target current and outputting a driving current corresponding to the target current, and wherein, when the slip determining unit determines that the wheel is in the slipping state, the damper control unit outputs a driving current corresponding to a previous target current instead of the updated target current.

6. The suspension control apparatus according to claim 1, wherein the damper control unit performs an unsprung vibration damping control using the variation in the wheel speed, and wherein when the slip determining unit determines that the wheel is in the slipping state, the damper control unit suppresses the unsprung vibration damping control using the variation in the wheel speed.

7. A suspension control apparatus for use in a vehicle including a variable damping force damper with a damping force adjustable in accordance with an input signal, the suspension control apparatus comprising:

a wheel speed sensor detecting a wheel speed of each wheel of the vehicle;

a wheel speed variation calculating circuit calculating a variation in the wheel speed detected by the wheel speed sensor;

a basic input amount calculating circuit calculating an unsprung weight of a suspension of the vehicle using the calculated variation in the wheel speed;

a state quantity calculating circuit calculating a quantity of state of the vehicle by inputting the calculated unsprung weight into a vehicle model that represents a behavior of the vehicle;

a damper controller performing a damper control based on the variation in the wheel speed detected by the wheel speed sensor, by controlling the damping force of the variable damping force damper, the damper controller performing a skyhook control using the calculated quantity of the state of the vehicle;

a vehicle body speed estimating circuit estimating a vehicle body speed using a vehicle body acceleration of the vehicle; and a slip determining computer determining that the wheel is in a slipping state when a value detected by the wheel speed sensor deviates from an estimated wheel speed estimated using the vehicle body speed by a predetermined value or more, wherein, when the slip determining computer determines that the wheel is in the slipping state, the damper controller suppresses the skyhook control using the calculated quantity of the state of the vehicle.

8. The suspension control apparatus according to claim 7, wherein, when the slip determining computer determines that the wheel is in the slipping state, the damper controller suppresses the damper control based on the variation in the wheel speed detected by the wheel speed sensor, by fixing an amount of controlling on the variable damping force damper at a predetermined amount.

9. The suspension control apparatus according to claim 7, wherein, when the slip determining computer determines that the wheel is in the slipping state, the damper controller suppresses the damper control based on the variation in the wheel speed detected by the wheel speed sensor, by gradually decreasing an amount of controlling on the variable damping force damper from a predetermined amount.

10. The suspension control apparatus according to claim 7, further comprising:

a turning state quantity detector detecting a quantity of turning state of the vehicle, wherein the damper controller includes a roll controller setting an amount of controlling on the variable damping force damper on the basis of the quantity of the turning state detected by the turning state quantity detector, and when the slip determining computer determines that the wheel is in the slipping state, the damper controller maintains the amount of controlling set by the roll controller.

11. The suspension control apparatus according to claim 7, wherein the damper controller performs the damper control based on the variation in the wheel speed, by updating a target current and outputting a driving current corresponding to the target current, and wherein, when the slip determining computer determines that the wheel is in the slipping state, the damper controller outputs a driving current corresponding to a previous target current instead of the updated target current.

12. The suspension control apparatus according to claim 7, wherein the damper controller performs an unsprung vibration damping control using the variation in the wheel speed, and wherein when the slip determining computer determines that the wheel is in the slipping state, the damper controller suppresses the unsprung vibration damping control using the variation in the wheel speed.

* * * * *